United States Patent
Sun et al.

(10) Patent No.: US 11,528,366 B2
(45) Date of Patent: Dec. 13, 2022

(54) POLICY TRANSMISSION METHOD, POLICY CONTROL FUNCTION (PCF) NETWORK ELEMENT, AND COMPUTER STORAGE MEDIUM

(71) Applicant: Huawei Technologies Co., Ltd., Shenzhen (CN)

(72) Inventors: Haiyang Sun, Beijing (CN); Chunshan Xiong, Shenzhen (CN); Zheng Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 17/106,850

(22) Filed: Nov. 30, 2020

(65) Prior Publication Data

US 2021/0084173 A1    Mar. 18, 2021

Related U.S. Application Data

(63) Continuation of application No. PCT/CN2019/089199, filed on May 30, 2019.

(30) Foreign Application Priority Data

May 30, 2018 (CN) .......................... 201810538839.9

(51) Int. Cl.
*H04M 15/00* (2006.01)
*H04W 76/27* (2018.01)
(Continued)

(52) U.S. Cl.
CPC .............. *H04M 15/66* (2013.01); *H04W 8/08* (2013.01); *H04W 48/16* (2013.01); *H04W 76/27* (2018.02)

(58) Field of Classification Search
CPC ....... H04M 15/66; H04W 8/08; H04W 76/27; H04W 48/16
(Continued)

(56) References Cited

U.S. PATENT DOCUMENTS 10,057,775 B2 * 8/2018 Raleigh ................. H04M 15/64
2014/0064073 A1    3/2014 Sayeedi
(Continued)

FOREIGN PATENT DOCUMENTS

CN     1878421 A     12/2006
CN   104507099 A      4/2015
(Continued)

OTHER PUBLICATIONS

3GPP TS 23.503 V15.1.0 "3rd Generation Partnership Project; Technical Specification Group Services and System Aspects; Policy and Charging Control Framework for the 5G System; Stage 2 (Release 15)," Mar. 2018, 65 pages.
(Continued)

*Primary Examiner* — Mong-Thuy T Tran
(74) *Attorney, Agent, or Firm* — Conley Rose, P.C.

(57) ABSTRACT

A policy transmission method, a policy control function (PCF) network element, and a computer storage medium, where the method includes: obtaining, by a PCF network element, a connection management state of a terminal apparatus, where the connection management state includes a connected mode or an idle mode; and sending, by the PCF network element, policy rule information to the terminal apparatus when the connection management state of the terminal apparatus is the connected mode.

21 Claims, 8 Drawing Sheets

(51) Int. Cl.
*H04W 8/08* (2009.01)
*H04W 48/16* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0201400 | A1* | 7/2015 | Yin | H04W 68/02 |
| | | | | 370/329 |
| 2017/0265245 | A1* | 9/2017 | Yang | H04W 8/24 |
| 2018/0041984 | A1 | 2/2018 | Li et al. | |
| 2018/0227699 | A1* | 8/2018 | Kim | H04W 64/003 |
| 2018/0324577 | A1* | 11/2018 | Faccin | H04W 48/18 |
| 2019/0150219 | A1* | 5/2019 | Wang | H04W 12/06 |
| | | | | 370/329 |
| 2021/0029618 | A1* | 1/2021 | Jain | H04W 8/22 |

FOREIGN PATENT DOCUMENTS

| | | |
|---|---|---|
| CN | 106452804 A | 2/2017 |
| CN | 107018542 A | 8/2017 |
| CN | 107920377 A | 4/2018 |

OTHER PUBLICATIONS

3GPP TS 23.502 V15.1.0, "3rd Generation Partnership Project; Technical Specification Group Services and System Aspects; Procedures for the 5G System; Stage 2 (Release 15)," Mar. 2018, 285 pages.

Qualcomm Incorporated, "UE policy delivery in 5GS," 3GPP TSG CT WG1 Meeting #110, C1-182184, Kunming (P.R. of China), Apr. 16-20, 2018, 3 pages.

Qualcomm Incorporated, "UE policy delivery in 5GS," 3GPP TSG-CT WG1 Meeting #110, Kunming (P.R. of China), Apr. 16-20, 2018, C1-182185, 12 pages.

Nokia, et al., "Hop-by-hop delivery of UE policy," 3GPP TSG CT WG1 Meeting #110, Kunming (P.R. of China), Apr. 16-20, 2018, C1-182325, 3 pages.

Samsung, "UE Policy delivery procedure," 3GPP TSG SA WG2 Meeting #127, Apr. 16-20, 2018, Sanya, China, S2-183183, 4 pages.

Samsung: "Paging failure scenario for UE policy delivery", 3GPP Draft; S2-185004,May 27, 2018, XP051448513, total 2 pages.

Qualcomm Incorporated et al: "UE policy delivery in 5GS", 3GPP Draft; C1-182831, Apr. 20, 2018, XP051425325, total 8 pages.

Huawei, HiSilicon, "Service Control for Hybrid control," SA WG2 Meeting #127bis, May 28-Jun. 1, 2018, Newport Beach, USA, S2-185356, 2 pages.

* cited by examiner

POLICY TRANSMISSION METHOD, POLICY CONTROL FUNCTION (PCF) NETWORK ELEMENT, AND COMPUTER STORAGE MEDIUM

CROSS-REFERENCE TO RELATED APPLICATIONS

This application is a continuation of International Patent Application No. PCT/CN2019/089199, filed on May 30, 2019, which claims priority to Chinese Patent Application No. 201810538839.9, filed on May 30, 2018. The disclosures of the aforementioned applications are hereby incorporated by reference in their entireties.

TECHNICAL FIELD

This application relates to the communications field, and more specifically, to a control policy transmission method, PCF and AMF network elements, and a computer storage medium.

BACKGROUND

A next generation mobile communications network architecture (next generation system), also referred to as a 5th generation (5G) network architecture, has been released in the 3rd generation partnership project (3GPP).

In the 5G network architecture, transmission may be performed using an access and mobility management function (AMF) in a process in which a policy control function (PCF) network element communicates with a terminal apparatus (for example, the PCF sends a policy rule to the terminal apparatus). As subscription information, a location, a time, and the like change in the terminal apparatus, the PCF updates the policy rule delivered to the terminal apparatus.

When the terminal apparatus is in an idle mode, the terminal apparatus does not immediately update the policy rule. In this case, signaling overheads are unnecessary due to the policy rule delivered by the PCF to the terminal apparatus. Therefore, in the communication process in which the PCF delivers the policy rule to the terminal apparatus, how to reduce signaling overheads becomes an urgent problem to be resolved currently.

SUMMARY

This application provides a policy transmission method, PCF and AMF network elements, and a computer storage medium, such that signaling overheads can be reduced in a communication process in which a PCF delivers a policy rule to a terminal apparatus.

According to a first aspect, a control policy transmission method is provided. The method includes: obtaining, by a PCF network element, a connection management state of a terminal apparatus; and sending, by the PCF, policy rule information to the terminal apparatus when the connection management state of the terminal apparatus is a connected mode.

It should be understood that the connection management state of the terminal apparatus may include the connected mode or an idle mode.

For example, the terminal apparatus is a user equipment (UE). If the UE is in the idle mode, it may indicate that there is no non-access stratum (NAS) signaling connection on an N1 interface between the UE and an AMF. There is no N2 connection between an access network (AN) and the AMF, and there is no N3 connection between the AN and a user plane function (UPF). When the UE is in the idle mode, the UE may respond to a paging initiation service request procedure on a network side or actively initiate a service request procedure to enter the connected mode.

If the UE is in the connected mode, it may indicate that there is an NAS signaling connection on an N11 interface between the UE and the AMF. When the UE is in the connected mode, the UE may access the idle mode using an AN release procedure.

An implementation in which the PCF network element obtains the connection management state of the terminal apparatus is not specifically limited in this embodiment of this application. In an example, the PCF may obtain the connection management state of the terminal apparatus using the AMF. In another example, the PCF may alternatively obtain the connection management state of the terminal apparatus using a network data analytics function (NWDAF). In another example, the PCF may alternatively obtain the connection management state of the terminal apparatus using an application function (AF).

In the foregoing technical solution, the PCF network element can obtain the connection management state of the terminal apparatus, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced.

With reference to the first aspect, in some possible implementations of the first aspect, the PCF obtains the connection management state of the terminal apparatus from an access and mobility management function (AMF) network element.

In this embodiment of this application, the AMF notifies the PCF of a current connection management state of the terminal apparatus in a plurality of implementations. This is not specifically limited in this application. In an example, the AMF can notify the PCF whether the current connection management state of the terminal apparatus is the connected mode, and the PCF can deliver a UE policy rule to the terminal apparatus when the terminal apparatus is in the connected mode. In another example, the AMF can alternatively notify the PCF of a time period in which the terminal apparatus is in the connected mode, and the PCF can deliver a UE policy rule to the terminal apparatus in the time period in which the terminal apparatus is in the connected mode based on the time period in which the terminal apparatus is in the connected mode.

In a possible implementation, the PCF sends a first message to the AMF, where the first message includes information about a trigger, and the trigger is configured to: when the connection management state of the terminal apparatus is switched to the connected mode, trigger the AMF to send a second notification message to the PCF. The PCF receives the second notification message sent by the AMF, where the second notification message is used to notify the PCF that the connection management state of the terminal apparatus is the connected mode.

It should be understood that the PCF can send a message that includes the information about the trigger to the AMF, and can dispose a trigger in the AMF. The trigger may be a connection management state trigger of the terminal apparatus. When the connection management state of the terminal apparatus changes (the connection management state of the terminal apparatus is switched to the connected mode), the trigger can trigger the AMF to notify the PCF that the terminal apparatus is currently in the connected mode. The PCF can send the policy rule to the terminal apparatus when the terminal apparatus is in the connected mode.

The trigger disposed by the PCF in the AMF can subscribe to an event that the terminal apparatus enters the idle mode or the connected mode. The PCF can actively deliver an updated policy rule of the terminal apparatus only after the terminal apparatus enters the connected mode.

It should be understood that in some embodiments, if the terminal apparatus has not entered the connected mode, the policy rule that has been generated by the PCF can be stored in a buffer without being delivered, and the updated policy rule of the terminal apparatus can be actively delivered only after the terminal apparatus enters the connected mode.

In the foregoing technical solution, the PCF network element can dispose the connection management state trigger of the terminal apparatus in the AMF, and can trigger, when the connection management state of the terminal apparatus is switched to the connected mode, the AMF to notify the PCF that the terminal apparatus is in the connected mode. The PCF can deliver the policy rule to the terminal apparatus when the connection management state of the terminal apparatus is the connected mode, to avoid a problem that the terminal apparatus updates, when the terminal apparatus is in the idle mode, the policy rule delivered by the PCF, such that signaling overheads can be reduced.

In a possible implementation, the PCF receives first flag information sent by the AMF, where the first flag information is used to indicate that the connection management state of the terminal apparatus is the idle mode. The PCF receives a first notification message sent by the AMF, where the first notification message is used to notify the PCF that the connection management state of the terminal apparatus is the connected mode.

The terminal apparatus is in the idle mode when there is no signaling connection on an interface between the terminal apparatus and the AMF. When the terminal apparatus is in the idle mode, the AMF forbids the PCF to deliver a control policy, and the AMF can send flag information to the PCF, which may be used to indicate that the terminal apparatus is currently in the idle mode.

The terminal apparatus is in the connected mode when there is a signaling connection on an interface between the terminal apparatus and the AMF. When the terminal apparatus is in the connected mode, the AMF sends a notification message to the PCF, to notify the PCF that the terminal apparatus is currently in the connected mode, and deletes a flag. The PCF can send a control policy to the terminal device after receiving the notification message sent by the AMF.

It should be understood that the foregoing flag may be a flag set by the AMF. The AMF can set the flag when detecting that there is no signaling connection on the interface between the AMF and the terminal apparatus. The AMF can delete the flag when detecting that there is a signaling connection on the interface between the AMF and the terminal apparatus.

In the foregoing technical solution, the AMF can notify, through logic of the AMF, the PCF that the connection management state of the terminal apparatus is the connected mode, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced. Further, implementation is simple because there is no need to add a trigger.

In a possible implementation, before the PCF sends a first message to the AMF, the method further includes: receiving, by the PCF, first indication information sent by the AMF, where the first indication information is used to indicate that the policy rule fails to be sent; and sending, by the PCF, the first message to the AMF after the PCF receives the first indication information.

It should be understood that a UE route selection policy (URSP) may carry an indication indicating whether a control policy of the terminal apparatus needs to be immediately modified or may be later modified. For a terminal apparatus policy that carries an indication that the control policy of the terminal apparatus may be later modified, the PCF can subscribe to a connection state of the UE. For a terminal apparatus policy that carries an indication that the control policy of the terminal apparatus is immediately modified, the PCF needs to immediately deliver the policy, and triggers paging to the terminal apparatus when the terminal apparatus is in the idle mode.

Optionally, in some embodiments, a "paging priority" can be carried when the PCF transfers, to the AMF, a terminal apparatus policy that needs to be immediately delivered. After one paging failure, the PCF can improve the paging priority and retrigger paging. The AMF can re-page the terminal apparatus only in a case of a higher priority. The PCF can consider, only after a plurality of paging failures, that the terminal apparatus fails to be paged (the policy rule fails to be sent). In this case, the PCF can re-subscribe to the connection state of the UE from the AMF.

In the foregoing technical solution, when the policy rule of the terminal apparatus fails to be sent, the AMF can instruct the PCF to send a message that includes a trigger, can instruct the PCF to dispose the trigger in the AMF, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced.

In a possible implementation, the PCF receives first time information sent by the AMF, where the first time information includes a time indicating that the terminal apparatus enters the connected mode next time. The PCF sends the policy rule to the terminal apparatus in the time in which the terminal apparatus enters the connected mode.

Time information of which the AMF notifies the PCF is not specifically limited in this embodiment of this application. In an example, the AMF may notify the PCF of the time in which the terminal apparatus enters the connected mode next time, and the PCF may not generate a control rule for the terminal apparatus before a timer arrives. In another example, the time information sent by the AMF to the PCF may include all time periods that are in a period and in which the terminal apparatus enters the connected mode, and the PCF may not generate a control rule for the terminal apparatus before each time period in which the terminal apparatus enters the connected mode.

A tracking area (TA) of the terminal apparatus enables a network device to know a location of the terminal apparatus in a timely manner. When paging the terminal apparatus, the network device searches for all cells in a location area of the terminal apparatus. The location of the terminal apparatus does not need to be updated in a location area. When moving across TAs, the terminal apparatus needs to initiate a TA update process, such that a network knows the location area of the terminal apparatus. In addition, the terminal apparatus needs to periodically perform the TA update process to maintain close contact with a network side.

After a TA update (TAU) timer of the terminal apparatus expires, the terminal apparatus needs to update a TA location in a timely manner. When the terminal apparatus performs periodic TAU, the AMF can learn of a time period in which the terminal apparatus periodically enters the connected mode.

In the foregoing technical solution, the PCF can obtain, from the AMF, the time in which the terminal apparatus is in the connected mode next time, and can deliver the policy rule to the terminal apparatus in the time in which the terminal apparatus is in the connected mode next time, to avoid unnecessary signaling overheads caused because the terminal apparatus updates, when the terminal apparatus is in the idle mode, the policy rule delivered by the PCF, such that signaling overheads can be reduced. The PCF can determine, based on the time in which the terminal apparatus enters the connected mode next time, when and whether to prepare to deliver the policy rule, such that implementation is more flexible.

With reference to the first aspect, in some possible implementations of the first aspect, the PCF obtains second time information sent by a network data analytics function (NWDAF) network element, where the second time information is used to indicate a time in which the terminal apparatus enters the connected mode. The PCF sends the policy rule to the terminal apparatus in the time in which the terminal apparatus enters the connected mode.

In the foregoing technical solution, the PCF can obtain, from the NWDAF, the time in which the terminal apparatus is in the connected mode, and can deliver the policy rule to the terminal apparatus in the time in which the terminal apparatus is in the connected mode, to avoid unnecessary signaling overheads caused because the terminal apparatus updates, when the terminal apparatus is in the idle mode, the policy rule delivered by the PCF, such that signaling overheads can be reduced.

With reference to the first aspect, in some possible implementations of the first aspect, the PCF obtains third time information sent by an AF network element, where the third time information is used to instruct the AF to send a downlink data packet and/or accept an uplink data packet or indicate a time at which the AF sends a downlink data packet and/or accepts an uplink data packet. The PCF sends the policy rule to the terminal apparatus based on the third time information.

Optionally, in some embodiments, the PCF receives a third notification message sent by a session management function (SMF) network element, where the third notification message is used to notify the PCF that the connection management state of the terminal apparatus is the connected mode.

It should be understood that when the SMF and the AMF select a same PCF, and the AF sends downlink data to the UPF, the UPF receives the downlink data. If the terminal apparatus is in the idle mode (there is no N3 connection between the radio access network (RAN) and the UPF), the UPF can send a data notification (DN) to the SMF, the SMF can notify the PCF after receiving the DN, and the PCF can deliver the policy rule information to the terminal apparatus after receiving the notification message sent by the SMF.

In the foregoing technical solution, the PCF can deliver the policy rule to the terminal apparatus at the time at which the AF sends the downlink data packet and/or accepts the uplink data packet, to avoid unnecessary signaling overheads caused because the terminal apparatus updates, when the terminal apparatus is in the idle mode, the policy rule delivered by the PCF, such that signaling overheads can be reduced.

According to a second aspect, a control policy transmission method is provided. The method includes notifying, by an AMF network element, a PCF network element of a connection management state of a terminal apparatus, where the connection management state includes a connected mode or an idle mode.

In this embodiment of this application, the AMF notifies the PCF of a current connection management state of the terminal apparatus in a plurality of implementations. This is not specifically limited in this application. In an example, the AMF can notify the PCF whether the current connection management state of the terminal apparatus is the connected mode, and the PCF can deliver a UE policy rule to the terminal apparatus when the terminal apparatus is in the connected mode. In another example, the AMF can alternatively notify the PCF of a time period in which the terminal apparatus is in the connected mode, and the PCF can deliver a UE policy rule to the terminal apparatus in the time period in which the terminal apparatus is in the connected mode based on the time period in which the terminal apparatus is in the connected mode.

In this embodiment of this application, the AMF can instruct the PCF to learn, in a plurality of implementations, whether the terminal apparatus is in the connected mode. This is not specifically limited in this application. In an example, the AMF can notify the PCF of the connection management state of the terminal apparatus through logic of the AMF. In another example, the PCF can dispose a trigger in the AMF, and the AMF can trigger the trigger using an event, to notify the PCF of the connection management state of the terminal apparatus. In another example, the PCF can obtain, from the AMF, a time period in which the terminal apparatus is in the connected mode.

In the foregoing technical solution, the AMF network element can notify the PCF of a current connection management state of the terminal apparatus when the connection management state of the terminal apparatus is switched to the connected mode, and the PCF can deliver a policy rule to the terminal apparatus when the connection management state of the terminal apparatus is the connected mode, to avoid a problem that the terminal apparatus updates, when the terminal apparatus is in the idle mode, the policy rule delivered by the PCF, such that signaling overheads can be reduced.

With reference to the second aspect, in some possible implementations of the second aspect, the AMF sends first flag information to the PCF when the connection management state of the terminal apparatus is the idle mode, where the first flag information is used to indicate that the connection management state of the terminal apparatus is the idle mode. The AMF sends a first notification message to the PCF when the connection management state of the terminal apparatus is the idle mode, where the first notification message is used to notify the PCF that the connection management state of the terminal apparatus is the connected mode.

In some possible implementations of the second aspect, the AMF receives a first message sent by the PCF, where the first message includes information about a trigger, and the trigger is configured to: when the connection management state of the terminal apparatus is switched to the connected mode, trigger the AMF to send a second notification message to the PCF. The AMF sends the second notification message to the PCF when the connection management state of the terminal apparatus is switched to the connected mode.

The PCF can send a message that includes the information about the trigger to the AMF, and can dispose a trigger in the AMF. The trigger may be a connection management state trigger of the terminal apparatus. When the connection management state of the terminal apparatus changes (the connection management state of the terminal apparatus is switched to the connected mode), the trigger can trigger the AMF to notify the PCF that the terminal apparatus is currently in the connected mode. The PCF can send a policy rule to the terminal apparatus when the terminal apparatus is in the connected mode.

With reference to the second aspect, in some possible implementations of the second aspect, the AMF sends first indication information to the PCF, where the first indication information is used to indicate that the policy rule fails to be sent.

It should be understood that the AMF can send a UE connected mode setting instruction to the PCF, to instruct the PCF to dispose the trigger. The PCF can dispose the trigger after receiving the instruction.

Optionally, in some embodiments, a URSP may carry an indication indicating whether policy content needs to be immediately modified or may be later modified.

When the URSP carries an indication that policy rule information of the terminal apparatus may be later modified, the PCF may not need to immediately deliver the policy rule information, and the PCF may actively deliver the policy rule information of the terminal device only after the terminal apparatus enters the connected mode.

When the URSP carries an indication that policy rule information of the terminal apparatus needs to be immediately modified, the PCF needs to immediately deliver the policy rule information of the terminal apparatus, and may initiate paging to the terminal apparatus if the terminal apparatus is in the idle mode.

In this embodiment of this application, if the PCF needs to immediately deliver the policy rule information of the terminal apparatus, a "paging priority" can be carried when the PCF transfers the policy rule information of the terminal apparatus to the AMF. After one paging failure, the PCF can improve the paging priority and retrigger paging. The AMF re-initiates paging only in a case of a higher priority. The PCF can consider, only after a plurality of paging failures, that the terminal apparatus fails to be paged (this may indicate that the policy rule fails to be sent). In this case, the PCF can re-subscribe to a connection state of the UE from the AMF.

With reference to the second aspect, in some possible implementations of the second aspect, the AMF sends first time information to the PCF, where the first time information includes a time indicating that the terminal apparatus enters the connected mode next time.

The AMF may send one piece of time information to the PCF, where the time information may include the time in which the terminal apparatus enters the connected mode next time, and the PCF may deliver an updated policy rule to the terminal apparatus in the time in which the terminal apparatus enters the connected mode next time.

After a TAU timer of the terminal apparatus expires, the terminal apparatus needs to update a TA location in a timely manner. When the terminal apparatus performs periodic TAU, the AMF can learn of a time period in which the terminal apparatus periodically enters the connected mode.

According to a third aspect, a control policy transmission method is provided. The method includes sending, by an NWDAF network element, second time information to a PCF, where the second time information is used to indicate a time in which the terminal apparatus enters a connected mode.

In the foregoing technical solution, the NWDAF network element can notify the PCF of the time in which the terminal apparatus enters the connected mode, and the PCF can deliver a policy rule to the terminal apparatus when a connection management state of the terminal apparatus is the connected mode, to avoid a problem that the terminal apparatus updates, when the terminal apparatus is in an idle mode, the policy rule delivered by the PCF, such that signaling overheads can be reduced.

According to a fourth aspect, a control policy transmission method is provided. The method includes sending, by an AF network element, third time information to a PCF, where the third time information is used to instruct the AF to send a downlink data packet and/or accept an uplink data packet or indicate a time at which the AF sends a downlink data packet and/or accepts an uplink data packet.

It should be understood that when an SMF and an AMF select a same PCF, and the AF network element needs to deliver the downlink data packet or needs to receive the uplink data packet, the AF can send a download data packet message to a UPF, and the UPF can send a data notification DN to the SMF after receiving the download data packet message. The SMF can notify, after receiving the DN, the PCF that a terminal apparatus is currently in a connected mode, and the PCF can send a policy rule to the terminal apparatus after receiving the notification.

An implementation in which the SMF can notify, after receiving the DN, the PCF that the terminal apparatus is currently in the connected mode is not specifically limited in this embodiment of this application. In an example, a trigger may be disposed in the SMF when the SMF and the AMF select the same PCF. The trigger may be configured to: when there is the data notification DN, trigger the SMF to notify the PCF of a current connection state of the terminal apparatus.

In the foregoing technical solution, the AF network element can notify the PCF that the AF sends the downlink data packet and/or accepts the uplink data packet or of the time at which the AF sends the downlink data packet and/or accepts the uplink data packet. The PCF can deliver the policy rule to the terminal apparatus at the time at which the AF sends the downlink data packet and/or accepts the uplink data packet, to avoid a problem that the terminal apparatus updates, when the terminal apparatus is in an idle mode, the policy rule delivered by the PCF, such that signaling overheads can be reduced.

According to a fifth aspect, a PCF network element is provided. The PCF includes: a first obtaining module configured to obtain a connection management state of a terminal apparatus, where the connection management state includes a connected mode or an idle mode; and a first transceiver module configured to send policy rule information to the terminal apparatus when the connection management state of the terminal apparatus is the connected mode.

In the foregoing technical solution, the PCF network element can obtain the connection management state of the terminal apparatus, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced.

With reference to the fifth aspect, in some possible implementations of the fifth aspect, the first obtaining module is configured to obtain the connection management state of the terminal apparatus from an AMF network element.

In some possible implementations of the fifth aspect, the first obtaining module is configured to: receive first flag information sent by the AMF, where the first flag information is used to indicate that the connection management state of the terminal apparatus is the idle mode; and receive a first notification message sent by the AMF, where the first notification message is used to notify the PCF that the connection management state of the terminal apparatus is the connected mode.

In some possible implementations of the fifth aspect, the first obtaining module is configured to: send a first message to the AMF, where the first message includes information about a trigger, and the trigger is configured to: when the connection management state of the terminal apparatus is switched to the connected mode, trigger the AMF to send a second notification message to the PCF; and receive the second notification message sent by the AMF, where the second notification message is used to notify the PCF that the connection management state of the terminal apparatus is the connected mode.

In some possible implementations of the fifth aspect, the PCF further includes a second transceiver module configured to receive first indication information sent by the AMF, where the first indication information is used to indicate that the policy rule fails to be sent. Additionally, the first obtaining module is configured to send, by the PCF, the first message to the AMF after receiving the first indication information.

In some possible implementations of the fifth aspect, the first obtaining module is configured to receive first time information sent by the AMF, where the first time information includes a time indicating that the terminal apparatus enters the connected mode next time. The first transceiver module is configured to send the policy rule to the terminal apparatus in the time in which the terminal apparatus enters the connected mode.

With reference to the fifth aspect, in some possible implementations of the fifth aspect, the PCF further includes a second obtaining module configured to obtain second time information sent by an NWDAF network element, where the second time information is used to indicate a time in which the terminal apparatus enters the connected mode. The first transceiver module is configured to send the policy rule to the terminal apparatus in the time in which the terminal apparatus enters the connected mode.

With reference to the fifth aspect, in some possible implementations of the fifth aspect, the PCF further includes a third obtaining module configured to obtain third time information sent by an AF network element, where the third time information is used to instruct the AF to send a downlink data packet and/or accept an uplink data packet or indicate a time at which the AF sends a downlink data packet and/or accepts an uplink data packet. The first transceiver module is configured to send the policy rule to the terminal apparatus based on the third time information.

According to a sixth aspect, an AMF network element is provided. The AMF includes a notification module, configured to notify a PCF network element of a connection management state of a terminal apparatus, where the connection management state includes a connected mode or an idle mode.

In the foregoing technical solution, the AMF network element can notify the PCF of a current connection management state of the terminal apparatus when the connection management state of the terminal apparatus is switched to the connected mode, and the PCF can deliver a policy rule to the terminal apparatus when the connection management state of the terminal apparatus is the connected mode, to avoid a problem that the terminal apparatus updates, when the terminal apparatus is in the idle mode, the policy rule delivered by the PCF, such that signaling overheads can be reduced.

With reference to the sixth aspect, in some possible implementations of the sixth aspect, the notification module is configured to: send first flag information to the PCF when the connection management state of the terminal apparatus is the idle mode, where the first flag information is used to indicate that the connection management state of the terminal apparatus is the idle mode; and send a first notification message to the PCF when the connection management state of the terminal apparatus is the idle mode, where the first notification message is used to notify the PCF that the connection management state of the terminal apparatus is the connected mode.

With reference to the sixth aspect, in some possible implementations of the sixth aspect, the notification module is configured to: receive a first message sent by the PCF, where the first message includes information about a trigger, and the trigger is configured to: when the connection management state of the terminal apparatus is switched to the connected mode, trigger the AMF to send a second notification message to the PCF; and send the second notification message to the PCF when the connection management state of the terminal apparatus is switched to the connected mode.

In some possible implementations of the sixth aspect, the AMF further includes a transceiver module configured to send first indication information to the PCF, where the first indication information is used to indicate that the policy rule fails to be sent.

With reference to the sixth aspect, in some possible implementations of the sixth aspect, the notification module is configured to send first time information to the PCF, where the first time information includes a time indicating that the terminal apparatus enters the connected mode next time.

According to a seventh aspect, an NWDAF network element is provided, and includes a transceiver module configured to send second time information to a PCF, where the second time information is used to indicate a time in which the terminal apparatus enters a connected mode.

According to an eighth aspect, an AF network element is provided, and includes a transceiver module configured to send third time information to a PCF, where the third time information is used to instruct the AF to send a downlink data packet and/or accept an uplink data packet or indicate a time at which the AF sends a downlink data packet and/or accepts an uplink data packet.

According to a ninth aspect, a PCF network element is provided, and includes a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the PCF performs the method in any one of the first aspect or the possible implementations of the first aspect.

According to a tenth aspect, an AMF network element is provided, and includes a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the AMF performs the method in any one of the second aspect or the possible implementations of the second aspect.

According to an eleventh aspect, an NWDAF network element is provided, and includes a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the NWDAF performs the method in any one of the third aspect or the possible implementations of the third aspect.

According to a twelfth aspect, an AF network element is provided, and includes a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the AF performs the method in any one of the fourth aspect or the possible implementations of the fourth aspect.

According to a thirteenth aspect, a computer readable medium is provided, and is configured to store a computer program. The computer program includes an instruction used to perform the method in any possible implementation of any aspect.

According to a fourteenth aspect, a computer program product is provided. The computer program product includes computer program code. When the computer program code is run on a computer, the computer is enabled to perform the method in any possible implementation of any aspect.

According to a fifteenth aspect, a communications chip is provided, and stores an instruction. When the instruction is run on a wireless communications apparatus, the communications chip is enabled to perform the method in any possible implementation of any aspect.

DESCRIPTION OF EMBODIMENTS

Figure 1:
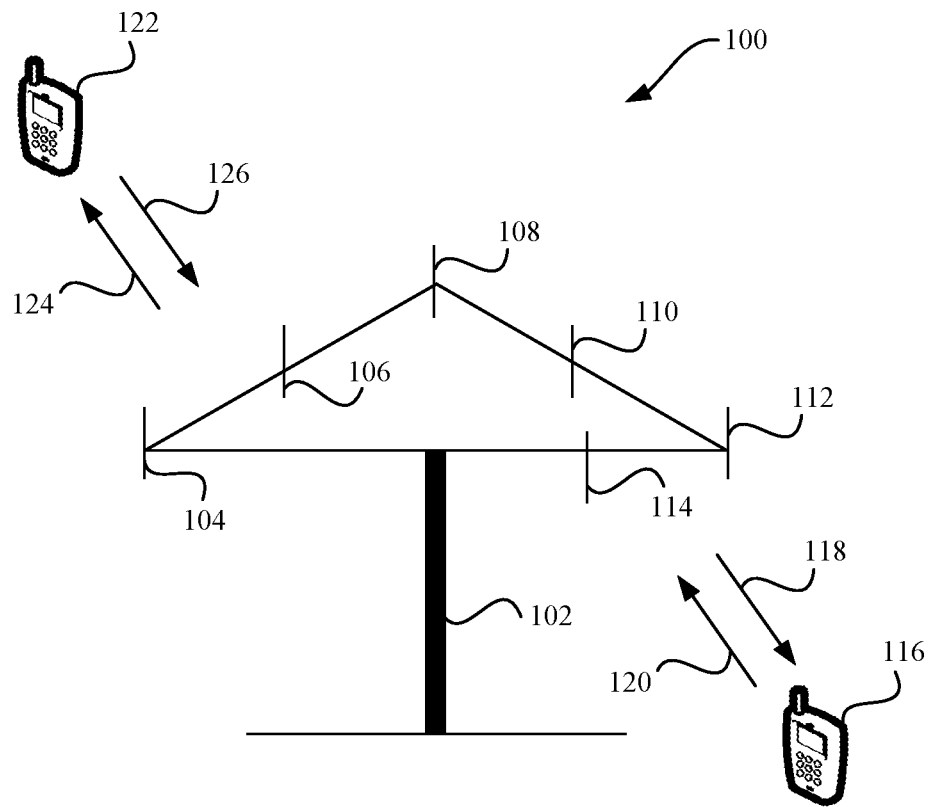
FIG. 1 is a schematic diagram of a scenario of a communications system 100 to which an embodiment of this application can be applied.

The following describes technical solutions of this application with reference to accompanying drawings.

It should be understood that the technical solutions of the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A type of a terminal apparatus is not specifically limited in the embodiments of this application. For example, the terminal apparatus may be a user equipment (UE), an access terminal, a terminal apparatus, a subscriber unit, a subscriber station, a mobile station, a mobile console, a remote station, a remote terminal, a mobile device, a user terminal, a wireless network device, a user agent, or a user apparatus. The terminal may include but is not limited to a mobile station (MS), a mobile phone, a UE, a handset, a portable device (portable equipment), a cellular phone, a cordless phone, a session initiation protocol (SIP) phone, a wireless local loop (WLL) station, personal digital processing (PDA), a radio frequency identification (RFID) terminal apparatus for logistics, a handheld device having a wireless communication function, a computing device, another device connected to a wireless modem, a vehicle-mounted device, a wearable device, a terminal apparatus in internet of things or internet of vehicles, a terminal apparatus in a future 5G network, a terminal apparatus in a future evolved public land mobile network (PLMN) network, or the like.

In an example instead of limitation, in the embodiments of this application, the terminal apparatus may alternatively be a wearable device. The wearable device may also be referred to as a wearable intelligent device, and is a general term for wearable devices such as glasses, gloves, a watch, clothes, and shoes that are developed by applying wearable technologies in intelligent designs of daily wear. The wearable device is a portable device that is directly worn on a body or integrated into clothes or an accessory of a user. The wearable device is not merely a hardware device, but implements a powerful function through software support, data exchange, and cloud interaction. In a broad sense, the wearable intelligent device includes a full-featured and large-sized device that can implement complete or partial functions without depending on a smartphone, such as a smartwatch or smart glasses, and a device that focuses on only one type of application function and needs to work with another device such as a smartphone, such as various smart bands or smart jewelry for monitoring physical signs.

A type of a network device is not specifically limited in the embodiments of this application. The network device may be any device configured to communicate with a terminal apparatus. For example, the network device may be a base transceiver station (BTS) in a Global System for Mobile Communications (GSM) or a code-division multiple access (CDMA) system, or may be a NodeB (NB) in a wideband code division multiple access (WCDMA) system, or may be an evolved NodeB (evolutional Node B (eNB) or eNodeB) in a Long-Term Evolution (LTE) system, or may be a radio controller in a cloud radio access network (CRAN) scenario. Alternatively, for example, the network device may be a relay node, an access point, a vehicle-mounted device, a wearable device, a network device in a future 5G network, a network device in a future evolved PLMN network, or the like.

In a possible manner, the network device may include a centralized unit (CU) and a distributed unit (DU). One CU may be connected to one DU, or a plurality of DUs may share one CU, to save costs and facilitate network expansion. The CU and the DU may be split based on a protocol stack. In a possible manner, a Radio Resource Control (RRC) layer, a service data mapping protocol stack (SDAP) layer, and a packet data convergence protocol (PDCP) layer are deployed in the CU, and a radio link control (RLC) layer, a media access control (MAC) layer, and a physical layer are deployed in the DU.

In addition, in the embodiments of this application, the network device provides a service for a cell, and the terminal apparatus communicates with the network device using a transmission resource (for example, a frequency domain resource or a spectrum resource) used in the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells are characterized by a small coverage area and low transmit power, and are applicable to providing a high-rate data transmission service.

A method provided in the embodiments of this application can be applied to a terminal apparatus or a network device. The terminal apparatus or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing using a process, for example, a Linux operating system, a UNIX operating system, an Android operating system, an iOS operating system, or a Windows operating system. The application layer includes an application such as a browser, an address book, word processing software, and instant messaging software. In addition, in the embodiments of this application, a specific structure of an execution body of the signal transmission method is not particularly limited in the embodiments of this application, provided that communication can be performed according to the signal transmission method in the embodiments of this application by running a program that records code of the signal transmission method in the embodiments of this application. For example, the wireless communication method in the embodiments of this application may be performed by the terminal apparatus or the network device, or a function module that is in the terminal apparatus or the network device and that can invoke the program and execute the program.

In addition, aspects or features in the embodiments of this application may be implemented as a method, an apparatus, or a product that uses standard programming and/or engineering technologies. The term "product" used in this application covers a computer program that can be accessed from any computer readable device, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD), a smart card, and a flash memory device (for example, an erasable programmable read-only memory (EPROM), a card, a stick, or a key drive). In addition, various storage media described in this specification may represent one or more devices and/or other machine-readable media that are configured to store information. The term "machine readable media" may include but is not limited to a radio channel and various other media that can store, include, and/or carry an instruction and/or data.

FIG. 1 is a schematic diagram of a scenario of a communications system 100 to which an embodiment of this application can be applied. As shown in FIG. 1, the communications system 100 includes a network device 102, and the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. Each antenna group in FIG. 1 shows two antennas. However, each group may include more or fewer antennas. The network device 102 may additionally include a transmitter chain and a receiver chain. A person of ordinary skill in the art may understand that the transmitter chain and the receiver chain may each include a plurality of components (for example, a processor, a modulator, a multiplexer, a demodulator, a demultiplexer, or an antenna) related to signal sending and receiving.

The network device 102 may communicate with a plurality of terminal apparatuses (for example, a terminal apparatus 116 and a terminal apparatus 122). However, it may be understood that the network device 102 may communicate with any quantity of terminal apparatuses similar to the terminal apparatus 116 or 122. For example, the terminal apparatuses 116 and 122 may each be a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal apparatus 116 communicates with the antennas 112 and 114. The antennas 112 and 114 send information to the terminal apparatus 116 using a forward link 116, and receive information from the terminal apparatus 116 using a reverse link 120. In addition, the terminal apparatus 122 communicates with the antennas 104 and 106. The antennas 104 and 106 send information to the terminal apparatus 122 using a forward link 124, and receive information from the terminal apparatus 122 using a reverse link 126.

For example, in a frequency division duplex (FDD) system, the forward link 116 may use a frequency band different from that used by the reverse link 120, and the forward link 124 may use a frequency band different from that used by the reverse link 126.

For another example, in a time division duplex (TDD) system and a full duplex system, the forward link 116 and the reverse link 120 may use a same frequency band, and the forward link 124 and the reverse link 126 may use a same frequency band.

Each antenna group and/or each area that are/is designed for communication are/is referred to as a sector of the network device 102. For example, an antenna group may be designed to communicate with a terminal apparatus in a sector of a coverage area of the network device 102. In a process in which the network device 102 respectively communicates with the terminal apparatuses 116 and 122 using the forward links 116 and 124, a transmit antenna of the network device 102 can improve signal-to-noise ratios of the forward links 116 and 124 through beamforming. In addition, in comparison with a manner in which the network device sends a signal to all terminal apparatuses of the network device using a single antenna, less interference is caused to a mobile device in a neighboring cell in a manner in which the network device 102 sends, through beamforming, a signal to the terminal apparatuses 116 and 122 that are randomly scattered in a related coverage area.

At a given time, the network device 102, the terminal apparatus 116, or the terminal apparatus 122 may be a wireless communications sending apparatus and/or a wireless communications receiving apparatus. When sending data, the wireless communications sending apparatus may encode the data for transmission. For example, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely a simplified schematic diagram of an example for ease of understanding. The network may further include another network device that is not shown in FIG. 1.

Figure 2:
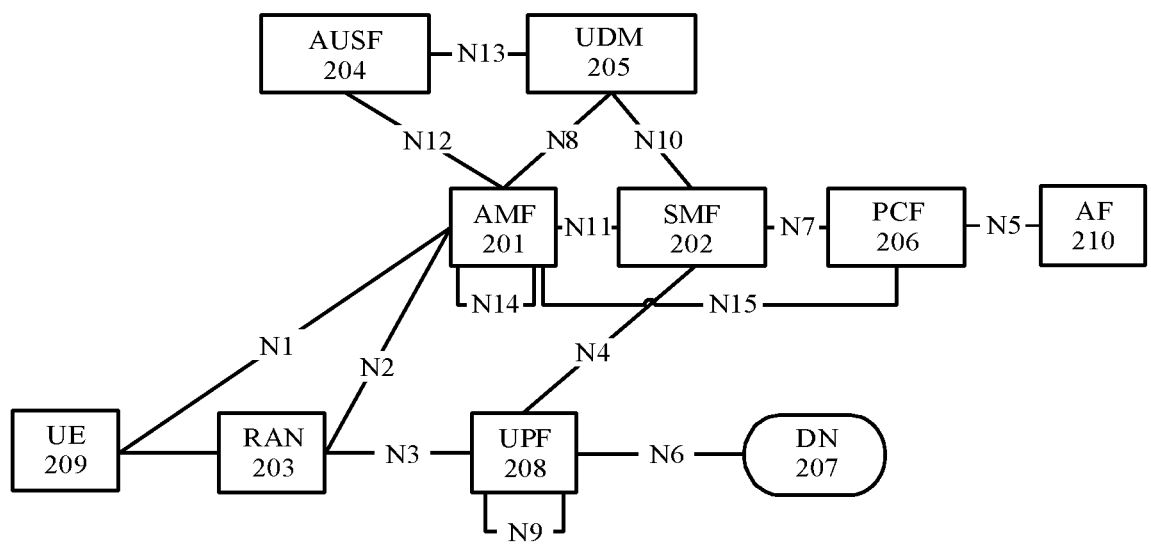
FIG. 2 is a schematic diagram of an architecture of a system to which an embodiment of this application can be applied.

FIG. 2 is a schematic diagram of an architecture of a system to which an embodiment of this application can be applied. As shown in FIG. 2, the system 200 includes an AMF 201, a session management function (SMF) device 202, a radio access network (RAN) 203, an authentication server function (AUSF) device 204, a unified data management (UDM) device 205, a policy control function (PCF) device 206, a data network (DN) 207, a user plane function (UPF) device 208, a user equipment (UE) 209, and an application function (AF) 210. The UE 209 is connected to the AMF 201 using an N1 interface, and the UE 209 is connected to the RAN 203 using a radio resource control (RRC) protocol. The RAN 203 is connected to the AMF 201 using an N2 interface, and the RAN 203 is connected to the UPF 208 using an N3 interface. A plurality of UPFs 208 are connected to each other using an N9 interface, and the UPF 208 is connected to the DN 207 using an N6 interface. In addition, the UPF 208 is connected to the SMF 202 using an N4 interface. The SMF 202 is connected to the PCF 206 using an N7 interface, and the SMF 202 is connected to the UDM 205 using an N20 interface. In addition, the SMF 202 is connected to the AMF 201 using an N11 interface. A plurality of AMFs 201 are connected to each other using an N14 interface, the AMF 201 is connected to the UDM 205 using an N8 interface, and the AMF 201 is connected to the AUSF 204 using an N12 interface. In addition, the AMF 201 is connected to the PCF 206 using an N15 interface. The AUSF 204 is connected to the UDM 205 using an N13 interface. The AMF 201 and the SMF 202 respectively obtain user subscription data from the UDM 205 using the N8 and N20 interfaces, and obtain policy data from the PCF 206 using the N15 and N7 interfaces. The AF 210 is connected to the PCF 206 using an N5 interface. The SMF 202 controls the UPF 208 using the N4 interface.

The following describes in detail functions of network elements in FIG. 2 that are related to this embodiment of this application.

AMF network element: is responsible for access and mobility management, and mainly includes functions related to access and mobility such as connection management, mobility management, registration management, access authentication and authorization, accessibility management, security context management, user authentication, handover, and location update.

PCF network element: mainly includes policy-related functions of making a unified policy, providing a control policy, obtaining subscription information related to policy decision from a unified data repository (UDR), and the like.

UPF network element: is responsible for a user plane function, and mainly includes user plane-related functions such as data packet routing and transmission, packet detection, service usage reporting, quality of service (QoS) processing, lawful interception, uplink packet detection, and downlink data packet storage.

SMF network element: is responsible for a session management function, and mainly includes session-related functions such as session management (for example, session establishment, modification, and release, including maintenance for a tunnel between a UPF and an AN), UPF selection and control, service and session continuity (SSC) mode selection, and roaming.

AF network element: is responsible for interacting with a 3GPP core network to provide a service or a service, and includes interaction with a network exposure function (NEF), policy architecture interaction, and the like. The NEF mainly includes a function of securely exposing, internally exposing, exposing, to a third party, a service and a capability that are provided by a 3GPP network function, or the like. The network exposure function converts or translates information exchanged with the AF and information exchanged with an internal network function, such as an AF service identifier and internal 5G core network information such as a data network name (DNN) and single network slice selection assistance information (S-NSSAI).

Network data analytics (NWDA) network element: mainly includes a logical function representing operator's management network analytics.

It should be noted that names of the network elements (for example, the SMF 202, the AF 210, and the UPF 208) included in FIG. 2 are merely names, and the names constitute no limitation on functions of the network elements. In a 5G network and another future network, the foregoing network elements may also be in other names. This is not specifically limited in this embodiment of this application. For example, in a 6G network, some or all of the foregoing network elements may follow the terms in 5G, may be in other names, or the like, and are centrally described herein. Details are not described below again.

As noted above, when a terminal apparatus is in an idle mode, the terminal apparatus does not immediately (does not need to) update a policy rule. In this case, signaling overheads are unnecessary due to the policy rule delivered by the PCF to the terminal apparatus.

It should be understood that the policy rule sent by the PCF to the terminal apparatus may include an access network discovery and selection policy (ANDSP) and a UE route selection policy (URSP). The ANDSP may be used by the terminal apparatus to select an access manner, and the URSP may be used by the terminal apparatus to select a protocol data unit (PDU) session.

As subscription information, a location, a time, and the like change in the terminal apparatus, the PCF updates the policy rule delivered to the terminal apparatus. When the terminal apparatus is in the idle mode, the terminal apparatus does not immediately update the policy rule. For example, the terminal apparatus does not immediately update the URSP in the policy rule. In this case, signaling overheads are unnecessary due to the policy rule delivered by the PCF to the terminal apparatus.

An embodiment of this application provides a control policy transmission method, such that signaling overheads can be reduced in a communication process in which a PCF delivers a policy rule to a terminal apparatus.

The following describes in detail the wireless network communication method provided in this embodiment of this application.

Figure 3:
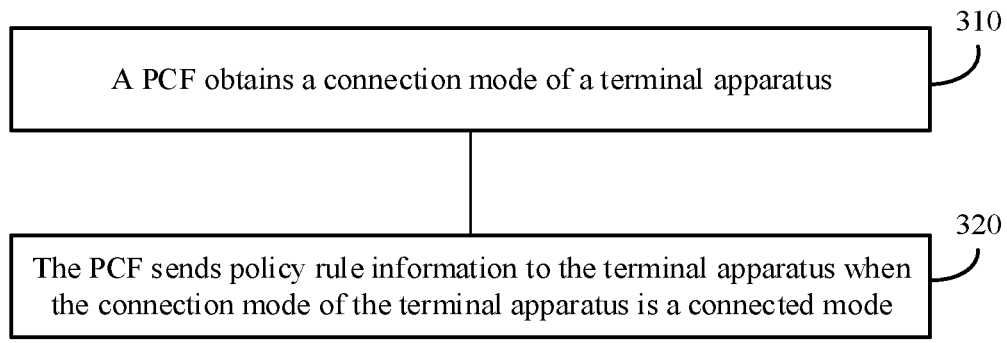
FIG. 3 is a schematic flowchart of a wireless network communication method according to an embodiment of this application.

FIG. 3 is a schematic flowchart of a wireless network communication method according to an embodiment of this application. The method in FIG. 3 may include steps 310 and 320. The following separately describes steps 310 and 320 in detail.

Step 310: A PCF obtains a connection management state of a terminal apparatus.

The connection management state of the terminal apparatus may be a connected mode or an idle mode.

It should be understood that there may be two connection management (CM) states of the terminal apparatus: CM-connected and CM-idle. The two states may be used to reflect a status of an NAS signaling connection between the terminal apparatus and the AMF.

An example in which the terminal apparatus is UE is used below for detailed description.

Referring to FIG. 2, if the UE is in the idle mode, it may indicate that there is no NAS signaling connection on the N1 interface between the UE and the AMF. There is no N2 connection between the AN and the AMF, and there is no N3 connection between the AN and the UPF. When the UE is in the idle mode, the UE may respond to a paging initiation service request procedure on a network side or actively initiate a service request procedure to enter the connected mode.

If the UE is in the connected mode, it may indicate that there is an NAS signaling connection on the N11 interface between the UE and the AMF. When the UE is in the connected mode, the UE may access the idle mode using an AN release procedure.

Step 310 may be implemented in a plurality of manners. This is not specifically limited in this embodiment of this application. In an example, the PCF may obtain the connection management state of the terminal apparatus using the AMF. In another example, the PCF may alternatively obtain the connection management state of the terminal apparatus using the NWDAF. In another example, the PCF may alternatively obtain the connection management state of the terminal apparatus using the AF. The following describes a plurality of implementations in step 310 in detail with reference to FIG. 4 to FIG. 7. Details are not described herein.

Step 320: The PCF sends policy rule information to the terminal apparatus when the connection management state of the terminal apparatus is a connected mode.

In this embodiment of this application, the PCF may obtain the connection management state of the terminal apparatus in a communication process in which the PCF delivers the policy rule to the terminal apparatus. The PCF may send a UE control policy rule to the terminal apparatus when the terminal apparatus is in the connected mode, to reduce a quantity of times that the UE control policy rule fails to be delivered, such that signaling overheads can be reduced.

Optionally, in some embodiments, the PCF may obtain the connection management state of the terminal apparatus using the AMF.

In this embodiment of this application, the AMF notifies the PCF of a current connection management state of the terminal apparatus in a plurality of implementations. This is not specifically limited in this application. In an example, the AMF can notify the PCF whether the current connection management state of the terminal apparatus is the connected mode, and the PCF can deliver a UE policy rule to the terminal apparatus when the terminal apparatus is in the connected mode. In another example, the AMF can alternatively notify the PCF of a time period in which the terminal apparatus is in the connected mode, and the PCF can deliver a UE policy rule to the terminal apparatus in the time period in which the terminal apparatus is in the connected mode based on the time period in which the terminal apparatus is in the connected mode.

The following describes in detail an example implementation in which the AMF can notify the PCF whether the current connection management state of the terminal apparatus is in the connected mode.

In this embodiment of this application, the AMF can instruct the PCF to learn, in a plurality of implementations, whether the terminal apparatus is in the connected mode. This is not specifically limited in this application. In an example, the AMF can notify the PCF of the connection management state of the terminal apparatus through logic of the AMF. In another example, the PCF can dispose a trigger in the AMF, and the AMF can trigger the trigger using an event, to notify the PCF of the connection management state of the terminal apparatus. In another example, the PCF can obtain, from the AMF, a time period in which the terminal apparatus is in the connected mode.

An example in which the PCF disposes the trigger in the AMF, and the AMF can trigger the trigger using the event, to notify the PCF of the connection management state of the terminal apparatus is used below for description.

The PCF can send a message that includes information about a trigger to the AMF, and can dispose a trigger in the AMF. The trigger may be a connection management state trigger of the terminal apparatus. When the connection management state of the terminal apparatus changes (the connection management state of the terminal apparatus is switched to the connected mode), the trigger can trigger the AMF to notify the PCF that the terminal apparatus is currently in the connected mode. The PCF can send a policy rule to the terminal apparatus when the terminal apparatus is in the connected mode.

The trigger disposed by the PCF in the AMF can subscribe to an event that the terminal apparatus enters the idle mode or the connected mode. The PCF can actively deliver an updated policy rule of the terminal apparatus only after the terminal apparatus enters the connected mode. Detailed descriptions are provided below with reference to FIG. 4. Details are not described herein.

It should be understood that in some embodiments, if the terminal apparatus has not entered the connected mode, the policy rule that has been generated by the PCF can be stored in a buffer without being delivered, and the updated policy rule of the terminal apparatus can be actively delivered only after the terminal apparatus enters the connected mode.

In this embodiment of this application, the PCF network element can dispose the connection management state trigger of the terminal apparatus in the AMF, and can trigger, when the connection management state of the terminal apparatus is switched to the connected mode, the AMF to notify the PCF that the terminal apparatus is in the connected mode. The PCF can deliver the policy rule to the terminal apparatus when the connection management state of the terminal apparatus is the connected mode, to avoid a problem that the terminal apparatus updates, when the terminal apparatus is in the idle mode, the policy rule delivered by the PCF, such that signaling overheads can be reduced.

Optionally, in some embodiments, a URSP may carry an indication indicating whether policy content needs to be immediately modified or may be later modified.

When the URSP carries an indication that policy rule information of the terminal apparatus may be later modified, the PCF may not need to immediately deliver the policy rule information, and the PCF may actively deliver the policy rule information of the terminal device only after the terminal apparatus enters the connected mode.

When the URSP carries an indication that policy rule information of the terminal apparatus needs to be immediately modified, the PCF needs to immediately deliver the policy rule information of the terminal apparatus, and may initiate paging to the terminal apparatus if the terminal apparatus is in the idle mode.

In this embodiment of this application, if the PCF needs to immediately deliver the policy rule information of the terminal apparatus, a "paging priority" can be carried when the PCF transfers the policy rule information of the terminal apparatus to the AMF. After one paging failure, the PCF can improve the paging priority and retrigger paging. The AMF re-initiates paging only in a case of a higher priority. The PCF can consider, only after a plurality of paging failures, that the terminal apparatus fails to be paged (this may indicate that the policy rule fails to be sent). In this case, the PCF can re-subscribe to a connection state of the UE from the AMF.

Optionally, in some embodiments, the AMF may send indication information to the PCF before the PCF sends the message that includes the information about the trigger to the AMF, where the indication information may be used to indicate that the policy rule fails to be sent. The PCF may send the message that includes the information about the trigger to the AMF after receiving the indication information sent by the AMF. Detailed descriptions are provided below with reference to FIG. 5. Details are not described herein.

It should be understood that the AMF can send a UE connected mode setting instruction to the PCF, to instruct the PCF to dispose the trigger. The PCF can dispose the trigger after receiving the instruction.

In this embodiment of this application, the AMF and the SMF may select different PCFs to perform policy control. For ease of distinguishing, a PCF used for access and mobility management (AM) policy control may be referred to as an AM-PCF, and a PCF connected to session management (SM) may be referred to as an SM-PCF.

It should be understood that both local break out (LBO) and home route (HR) roaming scenarios may be SM-related policy control scenarios, and are not related to a UE policy.

In a roaming scenario, there may be two AM-PCFs: a visited AM-PCF (vAM-PCF) and a home AM-PCF (hAM-PCF). In an LBO scenario, a visited SM-PCF (vSM-PCF) may be connected to a vSMF and may perform SM-related policy control. In an HR scenario, a home SM-PCF (hSM-PCF) may be connected to an hSMF and may perform SM-related policy control. Optionally, in some embodiments, when the foregoing mentioned SM-PCF and AM-PCF are a same PCF, the SM-PCF may subscribe to a CM state of the UE from the SMF. In this case, the SMF may subscribe to information about the state from the AMF.

Implementations in the embodiments of this application are described below in more detail with reference to examples. It should be noted that the following example is merely intended to help a person skilled in the art understand the embodiments of this application, instead of limiting the embodiments of this application to a specific value or a specific scenario shown in the example. A person skilled in the art can make various equivalent modifications or changes based on the examples described above, and such modifications and changes also fall within the scope of the embodiments of this application.

Figure 4:
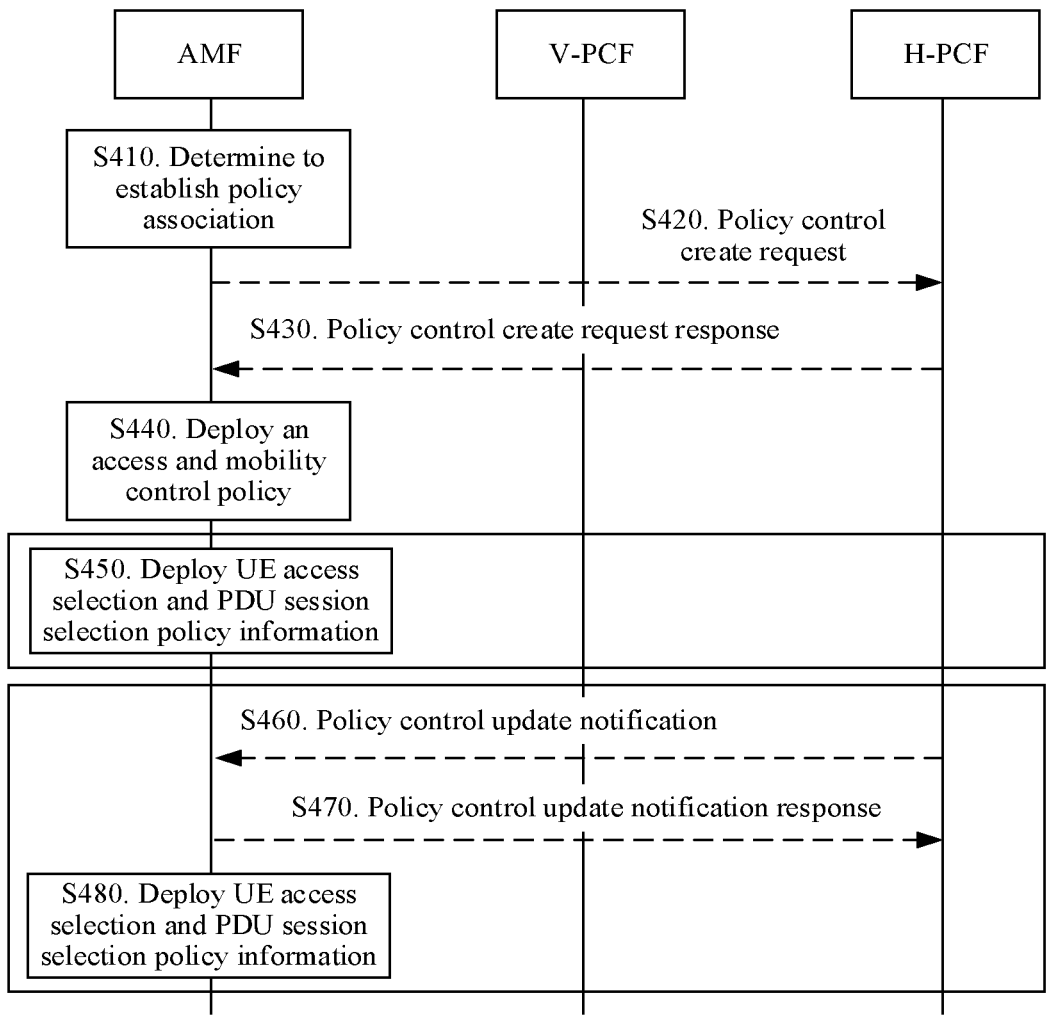
FIG. 4 is a schematic flowchart of a possible implementation in step 310 in FIG. 3.

FIG. 4 is a schematic flowchart of a possible implementation in step 310 in FIG. 3. The method in FIG. 4 may include steps 410 to 480. The following separately describes steps 410 to 480 in detail.

FIG. 4 is a schematic flowchart of an AM policy association establishment process.

Step 410: The AMF determines to establish policy association (decision to establish policy association).

Step 420: The AMF sends a policy control create (AM policy control create) request to a home PCF (H-PCF).

The H-PCF may be used to represent a PCF in a home domain (home PLMN).

Step 430: The H-PCF feeds back a policy control create request response (AM policy control create response) to the AMF, and carries a CM state change trigger of the UE (trigger: UE CM state change).

The policy control create request response that may be fed back by the H-PCF to the AMF may include information about a trigger. The trigger may be the connection management state change trigger of the UE. When a connection management state of the UE changes, the trigger may trigger the AMF to notify the H-PCF that the UE is currently in a connected mode. The following describes in detail modification of the trigger disposed by the PCF in the AMF. Details are not described herein.

Step 440: The AMF deploys an access and mobility control policy (deploy access and mobility control policy).

The method in FIG. 4 may subsequently include the following two cases.

Case 1: Step 450: The AMF deploys UE access selection and PDU session selection policy information (deploy UE access selection and PDU session selection policy information).

Case 2: Step 460: The H-PCF sends a policy control update notification (AM policy control update notify) request to the AMF.

Step 470: The AMF feeds back a policy control update notification request response (AM policy control update notify response) to the H-PCF.

Step 480: The AMF deploys UE access selection and PDU session selection policy information (deploy UE access selection and PDU session selection policy information).

It should be understood that in the foregoing AM policy association establishment process, the modification of the trigger disposed by the PCF in the AMF is shown in the following table:

| Trigger event | Description | Reporting condition (condition for reporting) |
| --- | --- | --- |
| Location change (tracking area) | A tracking area of UE has changed (the tracking area of the UE has changed) | PCF |
| Change of a presence reporting area of UE (change of UE presence in presence reporting area (PRA)) | UE is entering/leaving a reporting area (the UE is entering/leaving a presence reporting area) | PCF |
| Service area restriction change | Subscribed service area restriction information has changed | PCF |
| Change of a frequency selection priority index (radio access technology (RAT)/frequency selection priority (RFSP) index change) | A subscribed RFSP index has changed | PCF |
| Change of a connection management state of UE (change of UE CM state) | A connection management state of UE has changed (the UE CM state has changed) | PCF/always |

As shown in the foregoing table, the trigger disposed by the PCF in the AMF may subscribe to the change of the connection management state of the UE. When the connection management state of the UE changes (the UE switches to a connected mode), the trigger triggers the AMF to notify the PCF that the UE is in the connected mode.

Optionally, in some embodiments, the trigger does not trigger the AMF when the connection management state of the UE is switched to an idle mode. It should be understood that in this embodiment of this application, a control policy may be delivered by the H-PCF, or may be delivered by a V-PCF.

The V-PCF may be used to represent a PCF in a visited domain (visited PLMN).

When a control policy that needs to be delivered is delivered by the H-PCF (in other words, the V-PCF forwards, to the AMF, only an event to which the H-PCF subscribes), the forwarding procedure is the same as that in other approaches.

When a control policy that needs to be delivered is delivered by the V-PCF, the V-PCF subscribes to an event from the AMF, and the H-PCF delivers, to the V-PCF based on policy information corresponding to a policy identifier set (PSI), an indication indicating whether to immediately deliver a policy corresponding to the PSI.

Optionally, a corresponding PSI may be sent when policy content stored in a UDR is updated. If the PCF determines that updated policy information corresponding to the PSI may not need to be immediately updated, the PCF may actively deliver, only after the UE enters the connected mode, the updated UE policy corresponding to the PSI. In an example, when the policy information corresponding to the PSI is only a URSP, the policy information may not need to be immediately updated in this case, and the PCF may deliver, after the UE enters the connected mode, a UE policy that needs to correspond to the PSI. In another example, when it is identified that the policy information corresponding to the PSI does not need to be immediately updated, the PCF may deliver, after the UE enters the connected mode, a UE policy that needs to correspond to the PSI.

The foregoing mentioned AMF can send a UE connected mode setting instruction to the PCF, to instruct the PCF to dispose the trigger. The PCF can dispose the trigger after receiving the instruction.

In this embodiment of this application, the AMF can send the connected mode setting instruction to the PCF in step 420, to instruct the PCF to dispose the trigger. The PCF can dispose the trigger in the AMF in step 430.

Figure 5:
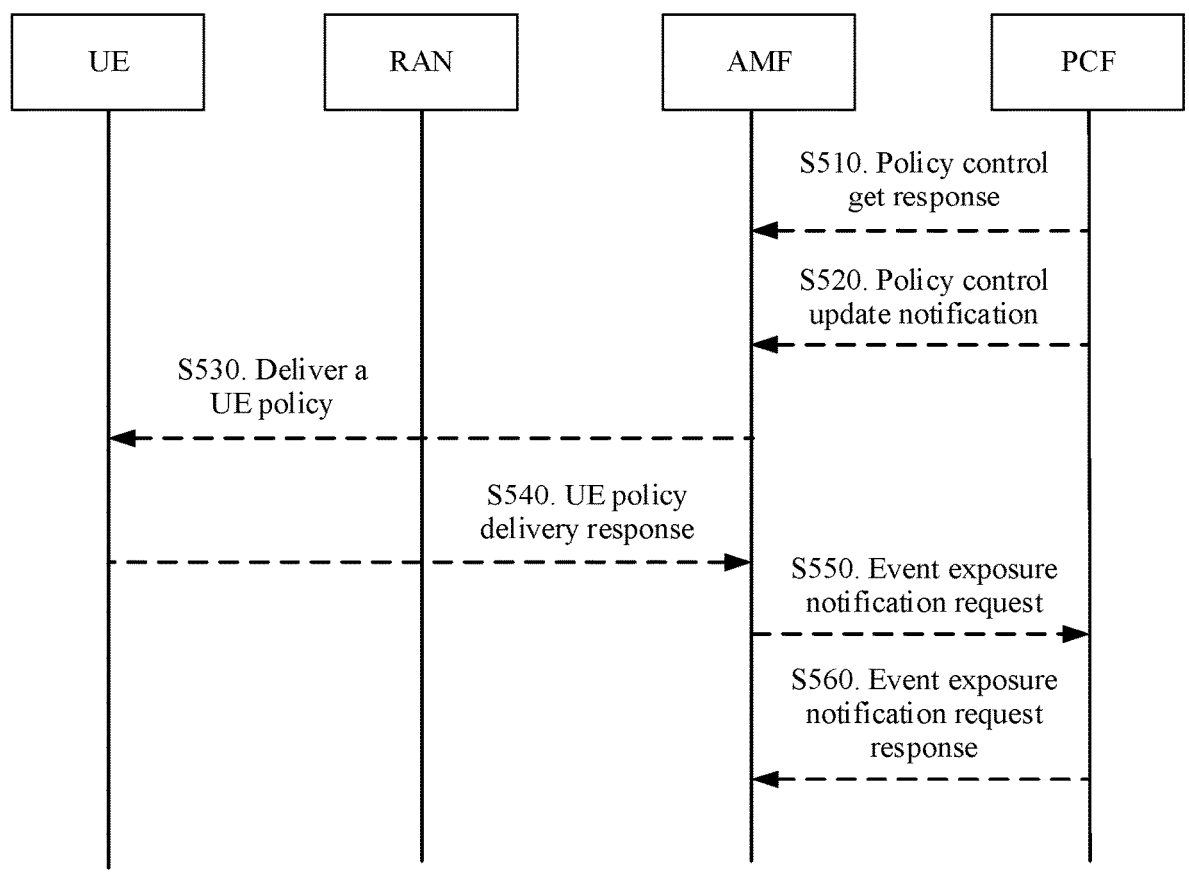
FIG. 5 is a schematic flowchart of a possible implementation according to an embodiment of this application.

The following describes, in detail with reference to FIG. 5, the foregoing mentioned implementation in which if the PCF needs to immediately deliver the policy rule information of the terminal apparatus, a "paging priority" can be carried when the PCF transfers the policy rule information of the terminal apparatus to the AMF.

FIG. 5 is a schematic flowchart of a possible implementation according to an embodiment of this application. The method in FIG. 5 may include steps 510 to 560. The following separately describes steps 510 to 560 in detail.

Step 510: The PCF sends an AM policy control get request response to the AMF.

When the PCF sends the AM policy control get response request response to the AMF, a paging priority of a UE control policy (UE policy) can be carried.

Step 520: The PCF sends an AM policy control update notification (AM policy control update notify) to the AMF.

When the PCF sends the AM policy control update notification to the AMF, a paging priority of a UE control policy (UE policy) can be carried.

It should be noted that a time at which the PCF adds the paging priority of the UE control policy is not specifically limited in this embodiment of this application. The PCF may add the paging priority of the policy in step 510, or the PCF may add the paging priority of the policy in step 520.

After the AMF performs paging one time, the PCF can improve the paging priority of the UE policy, and can re-initiate paging. The AMF can re-initiate paging in a case of a higher paging priority. After one or more paging failures, the PCF can subscribe to a connection state of the UE from the AMF, and can deliver a control policy to the UE when the UE is in a connected mode. For details that the PCF subscribes to the connection state of the UE from the AMF, refer to the description in FIG. 4. The details are not described herein again.

Step 530: The AMF delivers a UE control policy (delivery of UE policies) to the UE.

Step 540: The UE sends a UE control policy delivery response result (result of the delivery of UE policies) to the AMF.

Step 550: The AMF sends an event exposure notification request (event exposure notify request) to the PCF.

It should be understood that that the AMF sends the exposure notification to the PCF may be: The AMF reports a transfer result of the UE policy to the PCF.

Step 560: The PCF sends an event exposure notification request response (event exposure notify response) to the AMF.

An example in which the AMF can notify the PCF of the connection management state of the terminal apparatus through logic of the AMF is used below for description.

The terminal apparatus is in the idle mode when there is no signaling connection on an interface between the terminal apparatus and the AMF. When the terminal apparatus is in the idle mode, the AMF can forbid the PCF to deliver a control policy, and can set a flag. In an example, the AMF can notify the PCF that the terminal apparatus is currently in the idle mode.

The terminal apparatus is in the connected mode when there is a signaling connection on an interface between the terminal apparatus and the AMF. When the terminal apparatus is in the connected mode, the AMF sends a notification request to the PCF, to notify the PCF that the terminal apparatus is currently in the connected mode, and deletes a flag. The PCF can send a control policy to the terminal device after receiving the notification request sent by the AMF.

It should be understood that the foregoing flag may be a flag set by the AMF. The AMF can set the flag when detecting that there is no signaling connection on the interface between the AMF and the terminal apparatus. When detecting that there is the signaling connection on the interface between the AMF and the terminal apparatus, the AMF can notify, after deleting the flag, the PCF that the PCF can deliver the control policy to the terminal apparatus. For example, the AMF can notify the PCF that the terminal apparatus enters the connected mode.

In this embodiment of this application, the AMF can notify, through logic of the AMF, the PCF that the connection management state of the terminal apparatus is the connected mode, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced. Further, implementation is simple because there is no need to add a trigger.

An example in which the AMF notifies the PCF of the time period in which the terminal apparatus is in the connected mode, and the PCF can deliver the UE policy rule to the terminal apparatus in the time period in which the terminal apparatus is in the connected mode is used below for detailed description.

The AMF may send one piece of time information to the PCF, where the time information may include a time in which the terminal apparatus enters the connected mode next time, and the PCF may deliver an updated policy rule to the terminal apparatus in the time in which the terminal apparatus enters the connected mode next time.

An example in which the terminal apparatus performs periodic tracking area update (TAU) is used below for detailed description.

A tracking area (TA) of the terminal apparatus enables a network device to know a location of the terminal apparatus in a timely manner. When paging the terminal apparatus, the network device searches for all cells in a location area of the terminal apparatus. The location of the terminal apparatus does not need to be updated in a location area. When moving across TAs, the terminal apparatus needs to initiate a TA update process, such that a network knows the location area of the terminal apparatus. In addition, the terminal apparatus needs to periodically perform the TA update process to maintain close contact with a network side.

After a TAU timer of the terminal apparatus expires, the terminal apparatus needs to update a TA location in a timely manner. When the terminal apparatus performs periodic TAU, the AMF can learn of a time period in which the terminal apparatus periodically enters the connected mode.

Time information of which the AMF notifies the PCF is not specifically limited in this embodiment of this application. In an example, the AMF may notify the PCF of the time in which the terminal apparatus enters the connected mode next time, and the PCF may not generate a control rule for the terminal apparatus before a timer arrives. In another example, the time information sent by the AMF to the PCF may include all time periods that are in a period and in which the terminal apparatus enters the connected mode, and the PCF may not generate a control rule for the terminal apparatus before each time period in which the terminal apparatus enters the connected mode. Detailed descriptions are provided below with reference to FIG. 6. Details are not described herein.

It should be understood that in some embodiments, if the terminal apparatus has not entered the connected mode, the policy rule that has been generated by the PCF can be stored in a buffer without being delivered, and the updated policy rule of the terminal apparatus can be actively delivered only after the terminal apparatus enters the connected mode.

In this embodiment of this application, the PCF can obtain, from the AMF, a time at which the terminal apparatus enters the connected mode (a time in which the terminal apparatus is in the connected mode next time), and can deliver the policy rule to the terminal apparatus in the time in which the terminal apparatus is in the connected mode next time, to avoid unnecessary signaling overheads caused because the terminal apparatus updates, when the terminal apparatus is in the idle mode, the policy rule delivered by the PCF, such that signaling overheads can be reduced. The PCF can determine, based on the time in which the terminal apparatus enters the connected mode next time, when and whether to prepare to deliver the policy rule, such that implementation is more flexible.

Optionally, in some embodiments, after learning that the terminal apparatus is in the connected mode, the PCF can subscribe, from the AMF, to the time in which the terminal apparatus enters the connected mode next time.

Implementations in the embodiments of this application are described below in more detail with reference to examples. It should be noted that the following example is merely intended to help a person skilled in the art understand the embodiments of this application, instead of limiting the embodiments of this application to a specific value or a specific scenario shown in the example. A person skilled in the art can make various equivalent modifications or changes based on the examples described above, and such modifications and changes also fall within the scope of the embodiments of this application.

Figure 6:
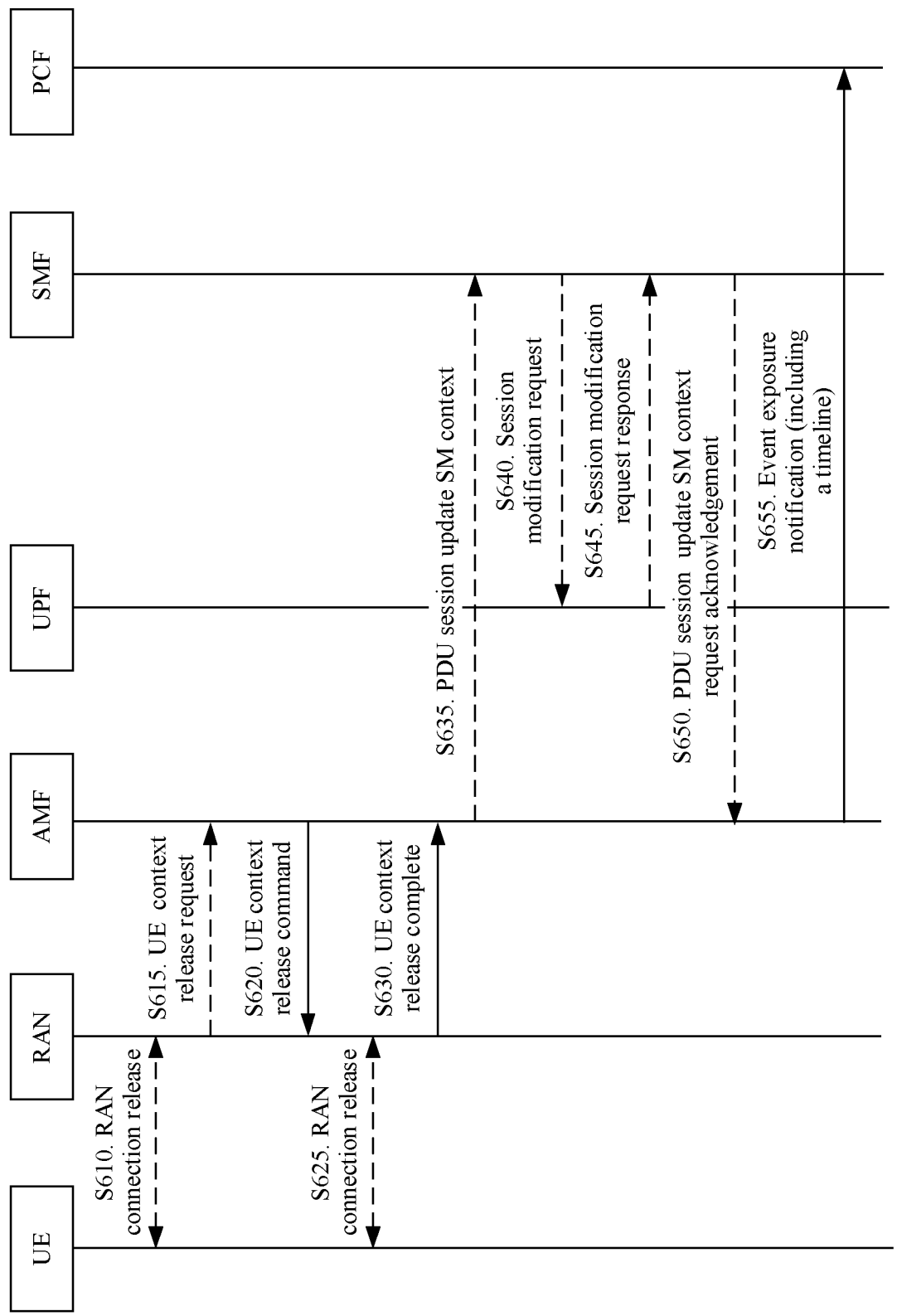
FIG. 6 is a schematic flowchart of a possible implementation in step 310 in FIG. 3.

FIG. 6 is a schematic flowchart of a possible implementation in step 310 in FIG. 3. The method in FIG. 6 may include steps 610 to 655. The following separately describes steps 610 to 655 in detail.

FIG. 6 is a schematic flowchart of a process in which an AMF reports an event exposure notification to a PCF after RAN connection release.

Step 610: The RAN and a UER perform access network connection release (RAN connection release).

Step 615: The RAN sends a UE context release request to the AMF.

Step 620: The AMF feeds back UE context release (UE context release command) to the RAN.

Step 625: The RAN and the UER perform access network connection release (RAN connection release).

Step 630: The RAN sends UE context release complete to the AMF.

Step 635: The RAN sends a PDU session update SM context to the SMF.

Step 640: The SMF sends a session modification request to the UPF.

Step 645: The UPF feeds back a session modification request response to the SMF.

Step 650: The SMF sends an update SM context request acknowledgement (PDU session update SM context ACK) to the AMF.

Step 655: The AMF sends an event exposure notification to the PCF, where the event exposure notification includes a timeline (event exposure notify (timeline)).

It should be understood that that the AMF sends the exposure notification to the PCF may be: The AMF reports a transfer result of a UE policy to the PCF.

The AMF can send a timeline to the PCF through periodic TAU after the UE disconnects from the RAN/AMF (the UE is in an idle mode). The timeline may be used to indicate a time period in which the UE enters a connected mode next time. After receiving the timeline, the PCF can deliver a policy rule to the UE in the timeline.

The foregoing mentioned implementation in which after learning that the terminal apparatus is in the connected mode, the PCF can subscribe, from the AMF, to the time in which the terminal apparatus enters the connected mode next time is described using FIG. 6 as an example.

In this embodiment of this application, after receiving, in step 655, the timeline sent by the AMF, the PCF can subscribe, from the AMF, to the time in which the terminal apparatus enters the connected mode next time.

An example in which an NWDAF notifies the PCF of a time period in which the terminal apparatus is in the connected mode, and the PCF can deliver a UE policy rule to the terminal apparatus in the time period in which the terminal apparatus is in the connected mode is used below for detailed description.

The NWDAF network element may send one piece of time information to the PCF, where the time information may include a time in which the terminal apparatus enters the connected mode, and the PCF may deliver an updated policy rule to the terminal apparatus in the time in which the terminal apparatus enters the connected mode. Detailed descriptions are provided below with reference to FIG. 7. Details are not described herein.

In this embodiment of this application, the PCF can obtain, from the NWDAF, a time at which the terminal apparatus enters the connected mode (a time in which the terminal apparatus is in the connected mode), and can deliver the policy rule to the terminal apparatus in the time in which the terminal apparatus is in the connected mode, to avoid unnecessary signaling overheads caused because the terminal apparatus updates, when the terminal apparatus is in the idle mode, the policy rule delivered by the PCF, such that signaling overheads can be reduced. The PCF can determine, based on the time in which the terminal apparatus enters the connected mode next time, when and whether to prepare to deliver the policy rule, such that implementation is more flexible.

Optionally, in some embodiments, after learning that the terminal apparatus is in the connected mode, the PCF can request, from the NWDAF, the time in which the terminal apparatus enters the connected mode next time.

Implementations in the embodiments of this application are described below in more detail with reference to examples. It should be noted that the following example is merely intended to help a person skilled in the art understand the embodiments of this application, instead of limiting the embodiments of this application to a specific value or a specific scenario shown in the example. A person skilled in the art can make various equivalent modifications or changes based on the examples described above, and such modifications and changes also fall within the scope of the embodiments of this application.

Figure 7:
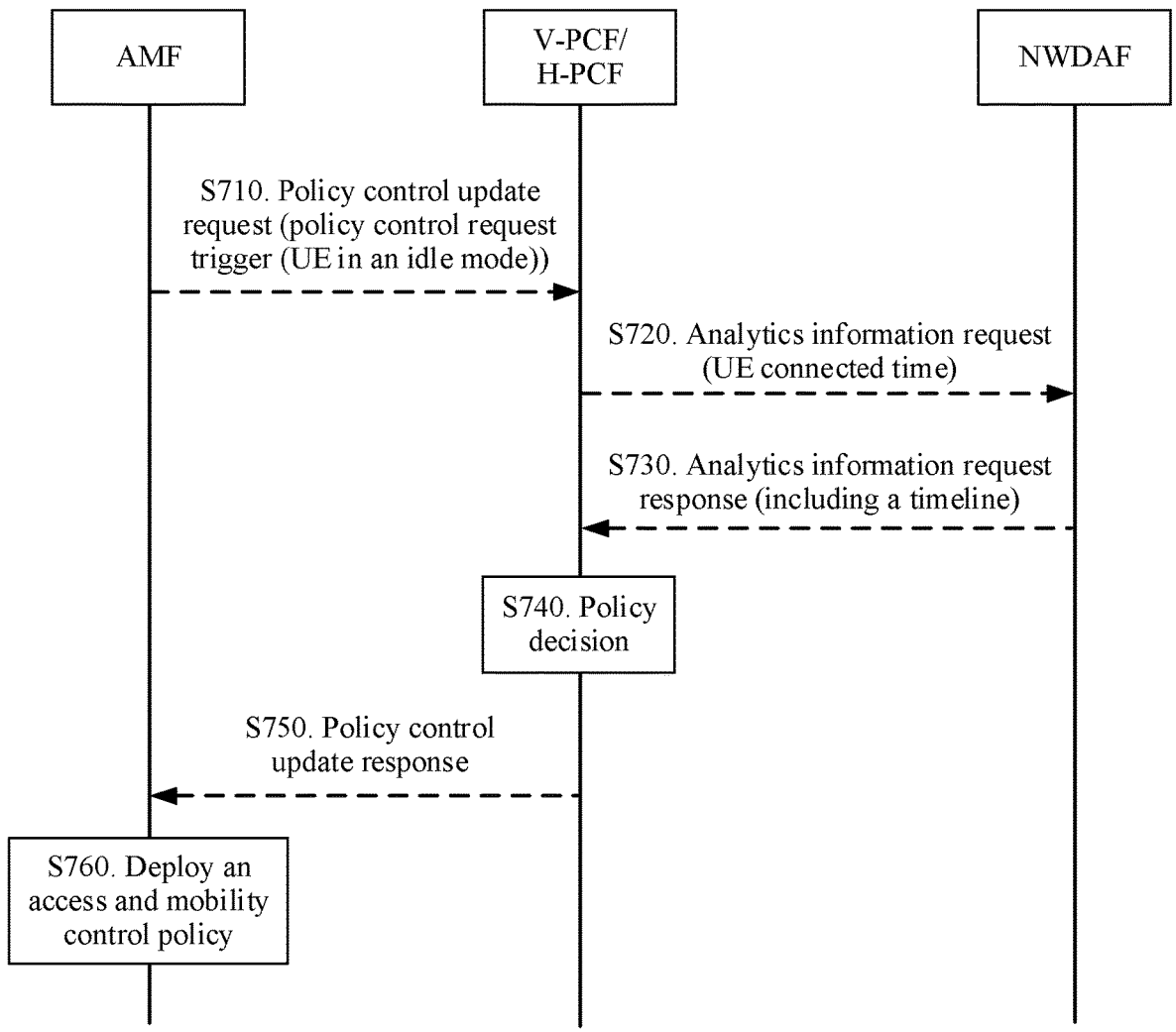
FIG. 7 is a schematic flowchart of a possible implementation in step 310 in FIG. 3.

FIG. 7 is a schematic flowchart of a possible implementation in step 310 in FIG. 3. The method in FIG. 7 may include steps 710 to 760. The following separately describes steps 710 to 760 in detail.

Step 710: The AMF sends a policy control update request (AM policy control update request) to the V-PCF/H-PCF.

The AMF may send a policy control request trigger to the V-PCF/H-PCF, and the UE may be in an idle mode (policy control request trigger: UE in idle mode).

Step 720: The V-PCF/H-PCF sends an analytics information request (UE connected time) (analytics Info request (UE connected time)) to the NWDAF.

When the UE may be in the idle mode, the V-PCF/H-PCF can request, from the NWDAF, a time in which the UE enters a connected mode.

Step 730: The NWDAF feeds back an analytics information request response to the V-PCF/H-PCF, where the analytics information request response carries a timeline (analytics Info response (timeline)).

The NWDAF may send, to the V-PCF/H-PCF based on a request that is for the time in which the UE enters the connected mode and that is sent by the V-PCF/H-PCF, the time (timeline) in which the UE enters the connected mode.

Step 740: The V-PCF/H-PCF makes a policy decision.

Step 750: The V-PCF/H-PCF sends a policy control update request response (AM policy control update response) to the AMF.

Step 760: The AMF deploys an access and mobility control policy (deploy access and mobility control policy).

An example in which an AF notifies the PCF of a time period in which the terminal apparatus is in the connected mode, and the PCF can deliver a UE policy rule to the terminal apparatus in the time period in which the terminal apparatus is in the connected mode is used below for detailed description.

It should be understood that when an SMF and an AMF select a same PCF, and the application function (AF) network element needs to deliver a downlink data packet or needs to receive an uplink data packet, the AF can send a download data packet request to a UPF, and the UPF can send a data notification (DN) to the SMF after receiving the download data packet request. The SMF can notify, after receiving the DN, the PCF that a terminal apparatus is currently in a connected mode, and the PCF can send a policy rule to the terminal apparatus after receiving the notification.

An implementation in which the SMF can notify, after receiving the DN, the PCF that the terminal apparatus is currently in the connected mode is not specifically limited in this embodiment of this application. In an example, a trigger may be disposed in the SMF when the SMF and the AMF select the same PCF. The trigger may be configured to: when there is the data notification DN, trigger the SMF to notify the PCF of a current connection state of the terminal apparatus. Detailed descriptions are provided below with reference to FIG. 8. Details are not described herein.

Implementations in the embodiments of this application are described below in more detail with reference to examples. It should be noted that the following example is merely intended to help a person skilled in the art understand the embodiments of this application, instead of limiting the embodiments of this application to a specific value or a specific scenario shown in the example. A person skilled in the art can make various equivalent modifications or changes based on the examples described above, and such modifications and changes also fall within the scope of the embodiments of this application.

Figure 8:
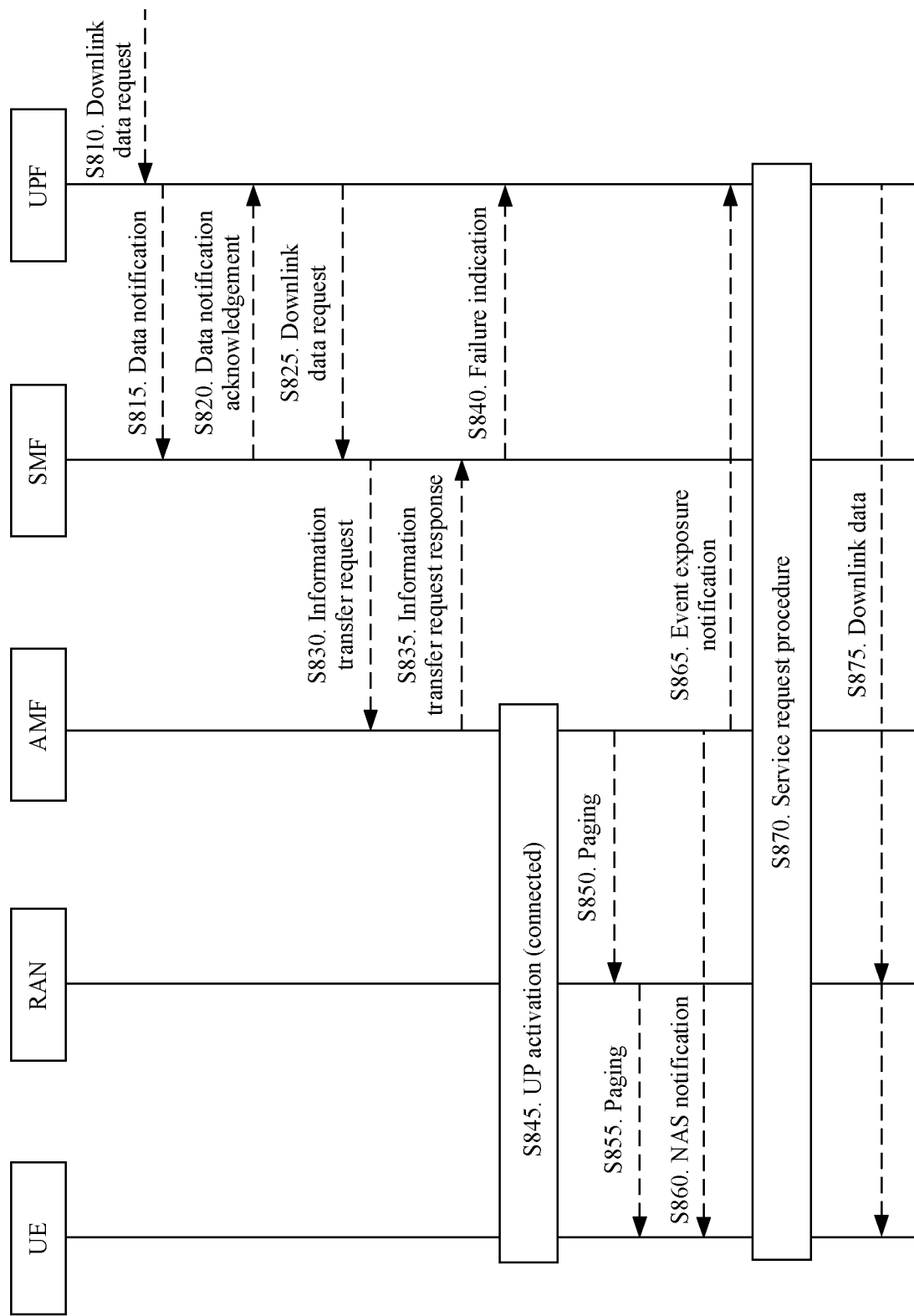
FIG. 8 is a schematic flowchart of a possible implementation in step 310 in FIG. 3.

FIG. 8 is a schematic flowchart of a possible implementation in step 310 in FIG. 3. The method in FIG. 8 may include steps 810 to 875. The following separately describes steps 810 to 875 in detail.

Step 810: The UPF receives a downlink data request.

For example, the UPF can receive the downlink data request sent by the AF (application). Step 815: The UPF sends a data notification (DN) to the SMF.

After receiving the DN sent by the UPF, the SMF may report the DN to the PCF. After receiving the DN, the PCF may deliver a control policy of the terminal apparatus.

For example, a trigger may be disposed in the SMF. The trigger may be configured to: when there is the data notification DN, trigger the SMF to notify the PCF of a current connection state of the terminal apparatus. Because the SMF and the AMF select a same PCF, the PCF may deliver the control policy of the terminal apparatus to the UE using the AMF when the AMF sends paging to the RAN in step 850.

Step 820: The SMF sends a data notification acknowledgement (ACK) to the UPF.

Step 825: The UPF sends the downlink data request to the SMF.

Step 830: The SMF sends an information transfer request to the AMF.

Step 835: The AMF sends an information transfer request response (message transfer response) to the SMF.

Step 840: The SMF sends a failure indication to the UPF.

Step 845: The UE, the RAN, and the AMF perform UP activation (connected) (UP reactivation (connected)).

Step 850: The AMF sends paging to the RAN.

Step 855: The RAN sends the paging to the UE.

Step 860: The AMF sends an NAS signaling notification (NAS notification) to the UE.

Step 865: The AMF sends an event exposure notification (event exposure notify) to the SMF.

Step 870: The UPF, the SMF, the AMF, the RAN, and the UE perform a service request procedure.

Step 875: The UPF sends the downlink data request to the RAN and the RAN sends the downlink data request to the UE.

The foregoing describes, in detail with reference to FIG. 1 to FIG. 8, the control policy transmission method provided in the embodiments of this application. The following describes in detail apparatus embodiments of this application with reference to FIG. 9 to FIG. 12. It should be understood that descriptions of the method embodiments correspond to descriptions of the apparatus embodiments. Therefore, for parts that are not described in detail, refer to the foregoing method embodiments.

Figure 9:
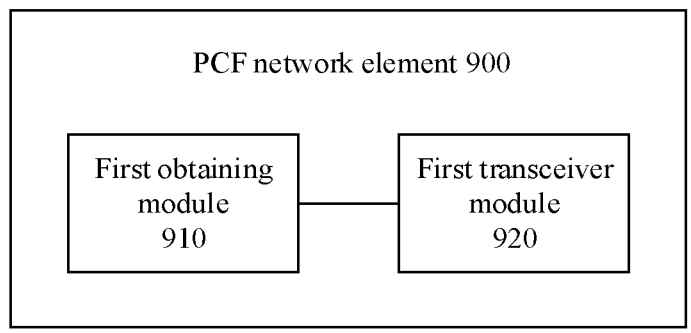
FIG. 9 is a schematic block diagram of a PCF network element 900 according to an embodiment of this application.

FIG. 9 is a schematic block diagram of a PCF network element 900 according to an embodiment of this application. The PCF network element 900 may include: a first obtaining module 910 configured to obtain a connection management state of a terminal apparatus, where the connection management state of the terminal apparatus includes a connected mode or an idle mode; and a first transceiver module 920 configured to send policy rule information to the terminal apparatus when the connection management state of the terminal apparatus is the connected mode.

In this embodiment of this application, the PCF network element can obtain the connection management state of the terminal apparatus, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced.

Optionally, in some embodiments, the first obtaining module 910 is configured to obtain the connection management state of the terminal apparatus from an access and mobility management function (AMF) network element.

Optionally, in some embodiments, the first obtaining module 910 is configured to: receive first flag information sent by the AMF, where the first flag information is used to indicate that the connection management state of the terminal apparatus is the idle mode; and receive, by the terminal apparatus, a first notification message sent by the AMF, where the first notification message is used to notify the PCF that the connection management state of the terminal apparatus is the connected mode.

Optionally, in some embodiments, the first obtaining module 910 is configured to: send a first message to the AMF, where the first message includes information about a trigger, and the trigger is configured to: when the connection management state of the terminal apparatus is switched to the connected mode, trigger the AMF to send a second notification message to the PCF; and receive the second notification message sent by the AMF, where the second notification message is used to notify the PCF that the connection management state of the terminal apparatus is the connected mode.

Optionally, in some embodiments, the PCF further includes: a second transceiver module 930 configured to: receive first indication information sent by the AMF, where the first indication information is used to indicate that the policy rule information fails to be sent; and send, by the PCF, the first message to the AMF after receiving the first indication information.

Optionally, in some embodiments, the first obtaining module 910 is configured to receive first time information sent by the AMF, where the first time information includes a time indicating that the terminal apparatus enters the connected mode next time. The first transceiver module 920 is configured to send, by the PCF, the policy rule information to the terminal apparatus when the time at which the terminal apparatus enters the connected mode next time arrives.

Optionally, in some embodiments, the PCF further includes: a second obtaining module 940 configured to obtain second time information sent by a network data analytics function (NWDAF) network element, where the second time information is used to indicate a time in which the terminal apparatus enters the connected mode. Additionally, the first obtaining module 910 is configured to send, by the PCF, the policy rule information to the terminal apparatus when the time at which the terminal apparatus enters the connected mode arrives.

Optionally, in some embodiments, the PCF further includes: a third obtaining module 950 configured to obtain third time information sent by an AF network element, where the third time information is used to instruct the AF to send a downlink data packet and/or accept an uplink data packet or indicate a time at which the AF sends a downlink data packet and/or accepts an uplink data packet. Additionally, the first obtaining module 910 is configured to send, by the PCF, the policy rule information to the terminal apparatus when the time at which the AF sends the downlink data packet and/or accepts the uplink data packet arrives.

Optionally, in some embodiments, the third obtaining module 950 is configured to receive a third notification message sent by a session management SMF network element, where the third notification message is used to notify the PCF that the connection management state of the terminal apparatus is the connected mode.

In this embodiment of this application, the PCF network element can obtain the connection management state of the terminal apparatus, and can deliver the policy rule to the terminal apparatus when the connection management state of the terminal apparatus is the connected mode, to avoid unnecessary signaling overheads caused because the terminal apparatus updates, when the terminal apparatus is in the idle mode, the policy rule delivered by the PCF, such that signaling overheads can be reduced.

Figure 10:
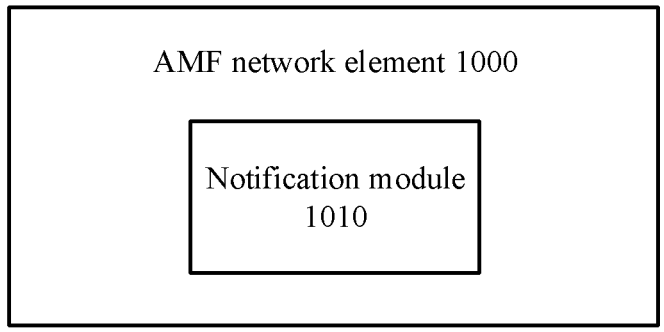
FIG. 10 is a schematic block diagram of an AMF network element 1000 according to an embodiment of this application.

FIG. 10 is a schematic block diagram of an AMF network element 1000 according to an embodiment of this application. Each module in the AMF network element 1000 is configured to perform each action or processing process performed by the AMF network element in the foregoing method. Herein, for detailed descriptions, refer to the foregoing descriptions to avoid repetition.

The AMF network element 1000 may include a notification module 1010 configured to: send first flag information to the PCF when a connection management state of the terminal apparatus is an idle mode, where the first flag information is used to indicate that the connection management state of the terminal apparatus is the idle mode; and send a first notification message to the PCF when the connection management state of the terminal apparatus is the idle mode, where the first notification message is used to notify the PCF that the connection management state of the terminal apparatus is a connected mode.

In the foregoing technical solution, the AMF network element can notify the PCF of a current connection management state of the terminal apparatus when the connection management state of the terminal apparatus is switched to the connected mode. Additionally, the PCF can deliver a policy rule to the terminal apparatus when the connection management state of the terminal apparatus is the connected mode, to avoid a problem that the terminal apparatus updates, when the terminal apparatus is in the idle mode, the policy rule delivered by the PCF, such that signaling overheads can be reduced.

Optionally, in some embodiments, the notification module 1010 is configured to: receive a first message sent by the PCF, where the first message includes information about a trigger, and the trigger is configured such that when the connection management state of the terminal apparatus is switched to the connected mode, the trigger triggers the AMF to send a second notification message to the PCF; and send the second notification message to the PCF when the connection management state of the terminal apparatus is switched to the connected mode.

Optionally, in some embodiments, the AMF network element 1000 further includes: a transceiver module 1020 configured to send first indication information to the PCF, where the first indication information is used to indicate that the policy rule fails to be sent.

Optionally, in some embodiments, the notification module 1020 is configured to send first time information to the PCF, where the first time information includes a time indicating that the terminal apparatus enters the connected mode next time.

Figure 11:
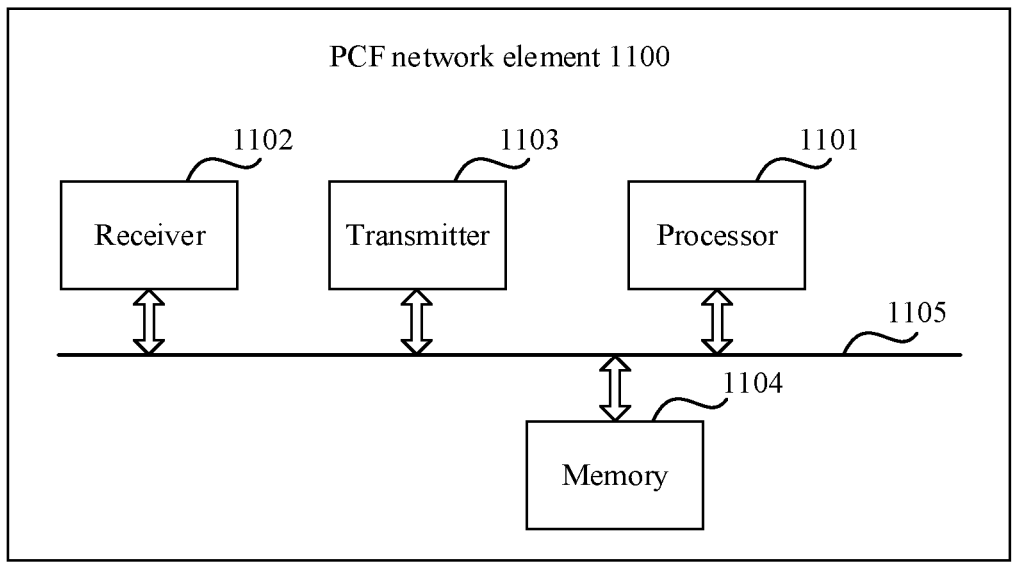
FIG. 11 is a schematic block diagram of a PCF network element 1100 according to an embodiment of this application.

FIG. 11 is a schematic block diagram of a PCF network element 1100 according to an embodiment of this application. The PCF network element 1100 may include a processor 1101, a receiver 1102, a transmitter 1103, and a memory 1104.

The processor 1101 may be communicatively connected to the receiver 1102 and the transmitter 1103. The memory 1104 may be configured to store program code and data that are of the network device. Therefore, the memory 1104 may be a storage unit inside the processor 1101, or an external storage unit independent of the processor 1101, or a component that includes a storage unit inside the processor 1001 and an external storage unit independent of the processor 1101.

Optionally, the network device may further include a bus 1105. The receiver 1102, the transmitter 1103, and the memory 1104 may be connected to the processor 1101 using the bus 1105. The bus 1105 may be a peripheral component interconnect (PCI) bus, an Extended Industry Standard Architecture (EISA) bus, or the like. The bus 1105 may be classified into an address bus, a data bus, a control bus, and the like. For ease of representation, only one thick line is used to represent the bus 1105 in FIG. 11, but this does not mean that there is only one bus or only one type of bus.

For example, the processor 1101 may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or any combination thereof. The processor 1101 may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor.

The receiver 1102 and the transmitter 1103 may be a circuit including the foregoing antenna, transmitter chain, and receiver chain, and may be independent circuits or a same circuit.

Figure 12:
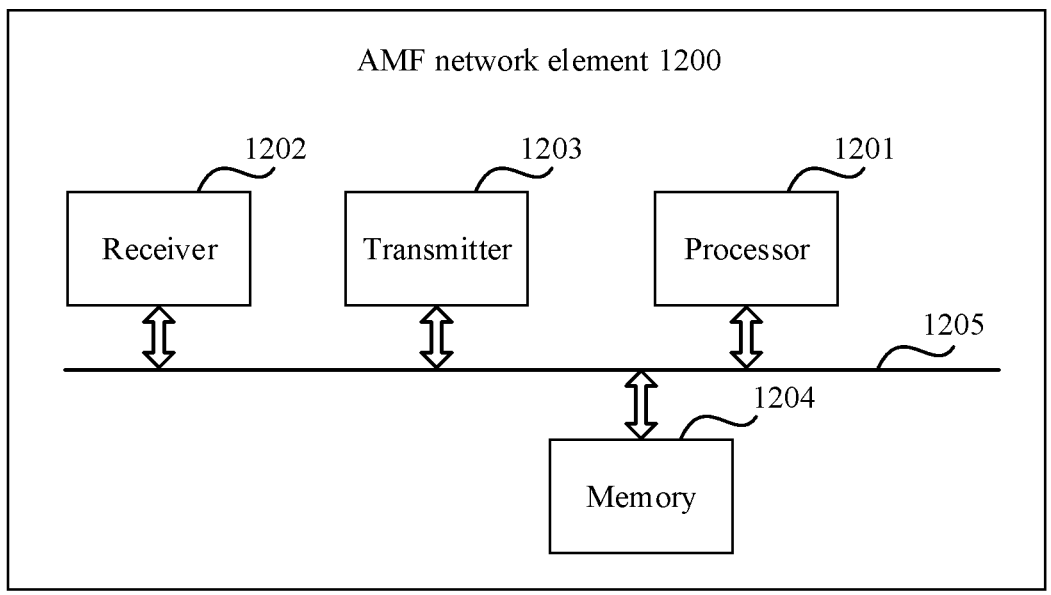
FIG. 12 is a schematic block diagram of an AMF network element 1200 according to an embodiment of this application.

FIG. 12 is a schematic block diagram of an AMF network element 1200 according to an embodiment of this application. The AMF network element 1200 may include a processor 1201, a receiver 1202, a transmitter 1203, and a memory 1204.

The processor 1201 may be communicatively connected to the receiver 1202 and the transmitter 1203. The memory 1204 may be configured to store program code and data that are of the network device. Therefore, the memory 1204 may be a storage unit inside the processor 1201, or an external storage unit independent of the processor 1201, or a component that includes a storage unit inside the processor 1201 and an external storage unit independent of the processor 1201.

Optionally, the network device may further include a bus 1205. The receiver 1202, the transmitter 1203, and the memory 1204 may be connected to the processor 1201 using the bus 1205. The bus 1205 may be a PCI bus, an EISA bus, or the like. The bus 1205 may be classified into an address bus, a data bus, a control bus, and the like. For ease of representation, only one thick line is used to represent the bus 1205 in FIG. 12, but this does not mean that there is only one bus or only one type of bus.

For example, the processor 1201 may be a CPU, a general-purpose processor, a DSP, an ASIC, an FPGA, or another programmable logical device, a transistor logical device, a hardware component, or any combination thereof. The processor 1201 may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor.

The receiver 1202 and the transmitter 1203 may be a circuit including the foregoing antenna, transmitter chain, and receiver chain, and may be independent circuits or a same circuit.

An embodiment of this application further provides an NWDAF network element, including a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the NWDAF performs the method in any one of the foregoing possible implementations.

An embodiment of this application further provides an AF network element, including a transceiver, a memory, and a processor. The transceiver, the memory, and the processor communicate with each other using an internal connection channel. The memory is configured to store an instruction. The processor is configured to execute the instruction stored in the memory, to control a receiver to receive a signal and control a transmitter to send a signal, such that the AF performs the method in any one of the foregoing possible implementations.

An embodiment of this application further provides a computer readable medium configured to store a computer program. The computer program includes an instruction used to perform the method in any possible implementation of any aspect.

An embodiment of this application further provides a computer program product. The computer program product includes computer program code. When the computer program code is run on a computer, the computer is enabled to perform the method in any possible implementation of any aspect.

An embodiment of this application further provides a chip system, applied to a communications device. The chip system includes at least one processor, at least one memory, and an interface circuit. The interface circuit is responsible for information exchange between the chip system and the outside. The at least one memory, the interface circuit, and the at least one processor are interconnected using a line. The at least one memory stores an instruction. The instruction is executed by the at least one processor to perform an operation of the network element in the method in the foregoing aspects.

An embodiment of this application further provides a computer program product, applied to a communications device. The computer program product includes a series of instructions, and when the instructions are run, an operation of the network element in the method in the foregoing aspects is performed.

In addition, the terms "system" and "network" may be often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and B may be determined based on A. However, it should further be understood that determining B based on A does not mean that B is determined based on A only, and B may also be determined based on A and/or other information.

All or some of the foregoing embodiments may be implemented using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

A person of ordinary skill in the art may be aware that units and algorithm steps in the examples described with reference to the embodiments disclosed in this specification can be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It may be understood by a person skilled in the art that for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps in the methods in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless network communication method, comprising:
 receiving, by a policy control function network element first indication information from an access and mobility management function network element, wherein the first indication information indicates that policy rule information has failed to be sent;
 sending, by the policy control function network element, information about a trigger to the access and mobility management function network element, wherein the trigger is a connection management state change trigger of a terminal apparatus;
 receiving, by the policy control function network element, a notification message from the access and mobility management function network element; and
 sending, by the policy control function network element, the policy rule information to the terminal apparatus when the notification message notifies the policy control function network element that the terminal apparatus enters a connected mode.

2. The wireless network communication method according to claim 1, further comprising receiving, by the policy control function network element, a policy control create request from the access and mobility management function network element.

3. The wireless network communication method according to claim 2, wherein sending the information about the trigger to the access and mobility management function network element comprises sending, by the policy control function network element, a policy control create response comprising the information about the trigger to the access and mobility management function network element.

4. The wireless network communication method according to claim 1, wherein the policy rule information comprises at least one of a user equipment route selection policy or an access network discovery and selection policy.

5. A communications system, comprising:
 an access and mobility management function network element configured to:
  send first indication information indicating that policy rule information has failed to be sent;
  receive information about a trigger, wherein the trigger is a connection management state change trigger of a terminal apparatus; and
  send a notification message when the terminal apparatus enters a connected mode; and
 a policy control function network element configured to:
  receive the first indication information from the access and mobility management function network element;
  send the information about the trigger to the access and mobility management function network element;
  receive the notification message from the access and mobility management function network element; and
  send the policy rule information to the terminal apparatus when the notification message notifies the policy control function network element that the terminal apparatus enters the connected mode.

6. The communications system according to claim 5, wherein the access and mobility management function network element is further configured to send a policy control create request to the policy control function network element.

7. The communications system according to claim 6, wherein the policy control function network element is further configured to receive the policy control create request, and to send the information about the trigger by sending a policy control create response comprising the information about the trigger to the access and mobility management function network element, and wherein the access and mobility management function network element is configured to receive the information about the trigger by receiving the policy control create response from the policy control function network element.

8. The communications system according to claim 5, wherein the policy rule information comprises an access network discovery and selection policy.

9. The communications system according to claim 5, wherein the policy rule information comprises a user equipment route selection policy, and an access network discovery and selection policy.

10. The communications system according to claim 5, wherein the trigger is configured such that when the terminal apparatus enters the connected mode, the trigger triggers the access and mobility management function network element to send the notification message to the policy control function network element.

11. A policy control function network element comprising:
- at least one processor; and
- one or more memories coupled to the at least one processor and configured to store programming instructions for execution by the at least one processor to:
  - receive first indication information front an access and mobility management function network element, wherein the first indication information indicates that policy rule information has failed to be sent;
  - send information about a trigger to the access and mobility management function network element, wherein the trigger is a connection management state change trigger of a terminal apparatus;
  - receive a notification message from the access and mobility management function network element; and
  - send the policy rule information to the terminal apparatus when the notification message notifies the policy control function network element that the terminal apparatus enters a connected mode.

12. The policy control function network element according to claim 11, wherein the policy rule information comprises a user equipment route selection policy.

13. The policy control function network element according to claim 11, wherein the trigger is configured such that when the terminal apparatus enters the connected mode, the trigger triggers the access and mobility management function network element to send the notification message to the policy control function network element.

14. The policy control function network element according to claim 11, wherein the at least one processor is configured to execute the programming instructions to receive a policy control create request from the access and mobility management function network element.

15. The policy control function network element according to claim 14, wherein the at least one processor is configured to execute the programming instructions to: send the information about the trigger by sending a policy control create response comprising the information about the trigger to the access and mobility management function network element.

16. The policy control function network element according to claim 12, wherein the policy rule information further comprises an access network discovery and selection policy.

17. A wireless network communication method, comprising:
- sending, by an access and mobility management function network element, first indication information to a policy control function network element, wherein the first indication information indicates that policy rule information has failed to be sent;
- receiving, by the access and mobility management function network element, information about a trigger from the policy control function network element, wherein the trigger is a connection management state change trigger of a terminal apparatus;
- sending, by an access and mobility management function network element, a notification message to the policy control function network element when the terminal apparatus enters a connected mode;
- receiving, by the policy control function network element, the notification message from the access and mobility management function network element; and
- sending, by the policy control function network element, the policy rule information to the terminal apparatus when the notification message notifies the policy control function network element that the terminal apparatus enters the connected mode.

18. The wireless network communication method according to claim 17, further comprising sending, by the access and mobility management function network element, a policy control create request to the policy control function network element.

19. The wireless network communication method according to claim 18, further comprising receiving, by the policy control function network element, the policy control create request from the access and mobility management function network element.

20. The wireless network communication method according to claim 18, wherein sending the information about the trigger comprises sending, by the policy control function network element, a policy control create response comprising the information about the trigger to the access and mobility management function network element, and wherein receiving the information about the trigger comprises receiving the policy control create response from the policy control function network element.

21. The wireless network communication method according to claim 17, wherein the trigger is configured such that when the terminal apparatus enters the connected mode, the trigger triggers the access and mobility management function network element to send the notification message to the policy control function network element.

* * * * *

UNITED STATES PATENT AND TRADEMARK OFFICE
CERTIFICATE OF CORRECTION

PATENT NO. : 11,528,366 B2
APPLICATION NO. : 17/106850
DATED : December 13, 2022
INVENTOR(S) : Haiyang Sun, Chunshan Xiong and Zheng Zhou It is certified that error appears in the above-identified patent and that said Letters Patent is hereby corrected as shown below:

In the Claims

Claim 1, Column 33, Line 65: "network element" should read "network element,"

Claim 15, Column 35, Line 52: "instructions to: send" should read "instructions to send"

Signed and Sealed this
Seventeenth Day of January, 2023

Katherine Kelly Vidal
Director of the United States Patent and Trademark Office